(12) United States Patent
Ghebremeskel et al.

(10) Patent No.: US 11,767,462 B2
(45) Date of Patent: Sep. 26, 2023

(54) POLYVINYL ALCOHOL-BASED PARTICULATE COMPOSITIONS

(71) Applicant: Kuraray Co., Ltd., Okayama (JP)

(72) Inventors: Ghebrehiwet Ghebremeskel, Houston, TX (US); Takuma Kaneshima, Houston, TX (US); Keisuke Morikawa, Houston, TX (US); Amanda Reneau, Houston, TX (US)

(73) Assignee: Kuraray Co., Ltd., Okayama (JP)

( * ) Notice: Subject to any disclaimer, the term of this patent is extended or adjusted under 35 U.S.C. 154(b) by 0 days.

(21) Appl. No.: 17/327,291

(22) Filed: May 21, 2021

(65) Prior Publication Data

US 2021/0380864 A1  Dec. 9, 2021

Related U.S. Application Data

(60) Provisional application No. 63/029,153, filed on May 22, 2020.

(51) Int. Cl.
 *C09K 8/508* (2006.01)
 *E21B 33/138* (2006.01)
(52) U.S. Cl.
 CPC .......... *C09K 8/5083* (2013.01); *C09K 8/5086* (2013.01); *E21B 33/138* (2013.01)

(58) Field of Classification Search
 None
 See application file for complete search history.

(56) References Cited

U.S. PATENT DOCUMENTS

| | | | |
|---|---|---|---|
| 2001/0053646 A1* | 12/2001 | Tanaka | D01F 6/04 442/338 |
| 2010/0200235 A1* | 8/2010 | Luo | E21B 33/138 507/265 |
| 2012/0067581 A1* | 3/2012 | Auzerais | C04B 40/0633 507/224 |
| 2014/0374106 A1* | 12/2014 | Zhu | D01D 5/30 166/305.1 |
| 2018/0163504 A1* | 6/2018 | Watson | C09K 8/426 |
| 2020/0071592 A1* | 3/2020 | Ghebremeskel | C09K 8/44 |
| 2020/0071605 A1* | 3/2020 | Ghebremeskel | E21B 33/138 |
| 2021/0163810 A1* | 6/2021 | Beuterbaugh | C09K 8/03 |

FOREIGN PATENT DOCUMENTS

WO   WO 2018/231236   * 12/2018 ............... C09K 8/88

* cited by examiner

*Primary Examiner* — Andrew Sue-Ako
(74) *Attorney, Agent, or Firm* — Morgan, Lewis & Bockius LLP

(57) ABSTRACT

Disclosed are particulate compositions comprising particles of a blend of one or more polyvinyl alcohol polymers with one or more aliphatic polyester polymers, wherein such particulate compositions are useful, for example, as plugging agents for treatments applied to a subterranean formation traversed by the borehole of an oil or gas well.

21 Claims, 8 Drawing Sheets

POLYVINYL ALCOHOL-BASED PARTICULATE COMPOSITIONS

FIELD OF THE INVENTION

This invention relates to a particulate compositions based on particles of a blend of a polyvinyl alcohol polymer with an aliphatic polyester polymer. Such particulate compositions have an appropriate solubility profile for use in a number of fields, including in various subsurface production operations as such as a diverting agents and/or loss circulation materials.

BACKGROUND OF THE INVENTION

Polyvinyl alcohol ("PVOH") is a well-known and versatile industrial material. It is routinely used for the purpose of fabricating films, fibers and shaped objects such as containers and devices for packaging, drug delivery and wound management. It is also experiencing growing use as a component in various compositions employed for the purpose of adjusting the permeability of a subterranean formation that is traversed by the borehole of a well drilled to enable the production of hydrocarbons and/or other valuable materials.

During the drilling of a wellbore in a subterranean geologic formation, various fluids, known generically as mud or mud compositions, are typically used in the well for a variety of functions. Fluid compositions used downhole may be water-based or oil-based, and may contain weighting agents, surfactants, proppants, polymers or other kinds of servicing components for other purposes. The fluids may be circulated through a drill pipe and drill bit down into the depth of the wellbore, and then should subsequently flow upward through the annulus of the wellbore to the surface. During this circulation, the wellbore fluid may act to perform needed operations such as to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

During these operations, the fluids exert hydrostatic and pumping pressure against the subterranean rock formations, but the formation rock frequently has pathways through which the fluids may escape the wellbore. Undesirable formation conditions can be encountered in which substantial amounts or, in some cases, practically all of the wellbore fluid may be lost to the formation. For example, wellbore fluid can leave the borehole through natural or induced fissures or fractures in the formation, through a highly porous rock matrix surrounding the borehole, or in formations that are fractured, highly permeable, porous, cavernous or vugular. The geologic formations into which wellbore fluids can be lost include those composed of earthen material such as shale, sands, gravel, shell beds, reef deposits, limestone, dolomite and chalk.

For a wellbore fluid to perform all of its functions and allow wellbore operations to continue, however, the fluid must stay in the borehole since the fluid is intended to pass down the borehole and circulate back up the annulus outside of the drill string or casing to the mud tanks. Unfortunately, induced fluid losses may occur when the fluid weight required for well control and to maintain a stable wellbore exceeds the fracture resistance of the formations. Loss of wellbore fluid into downhole formations, is a recurring problem in drilling operations There are various types of fluid loss. One type involves the loss of carrier fluid to the formation, leaving suspended solids behind. Another involves the escape of the entire fluid, including suspended solids, into the formation. The latter situation is called "lost circulation", and it can be an expensive and time-consuming problem. The loss may vary from a gradual lowering of the mud level in the tanks to a complete loss of returns. Lost circulation can also pose a safety hazard, leading to well-control problems and environmental incidents. During cementing, for example, lost circulation may severely compromise the quality of the cement job, reducing annular coverage, leaving casing exposed to corrosive downhole fluids, and/or failing to provide adequate zonal isolation.

In many cases, a subterranean formation may include two or more intervals having varying permeability and/or injectivity. Some intervals may possess relatively low (or lower) injectivity, or ability to accept injected fluids, due to relatively low permeability, high in-situ stress and/or formation damage. When performing well servicing operations, a wellbore fluid constituting or containing a well-servicing component to accomplish an activity such as acidizing, stimulating, work over, fracturing, sand control, or cementing may be pumped down the borehole. When performing well servicing operations on multiple intervals having variable injectivity, however, it is often the case that most, if not all, of the servicing fluid pumped downhole will be displaced into one, or only a few, of the intervals having the highest injectivity. The intervals of highest injectivity may not be the desired destination for the servicing fluid being provided to that location in the wellbore.

In an effort to more evenly distribute wellbore fluids into the interval, or into each of the multiple intervals, being serviced, methods and materials for diverting servicing fluids away from areas of higher permeability and/or injectivity that are not the desired destination have been developed. Chemical agents are known that generally create a cake of solid particles in front of high-permeability layers, thus diverting fluid flow to less-permeable zones, and this occurs primarily as the result of suction of the fluid onto the permeable surface (pressure greater in the well than in the formation) and the creation of a mud cake to seal a porous formation. Because entry of a wellbore fluid into a zone that is wholly or partly plugged, sealed or blocked by the presence of a cake is limited by the cake resistance, a diverting agent enables the fluid flow to equalize between zones of different permeabilities. Materials in a diverting agent that cause cake formation do so largely by providing a bridging effect, and are typically solids of various sizes and shapes such as granular, lamellar, fibrous, and mixtures thereof to plug the passageways in and out of leaking zones. When fluids containing such materials are pumped into the wellbore, the materials will tend to congregate against and seat themselves in the pathways in the formation rock through which wellbore fluids may most easily flow, thus providing and adding to the desired bridging effect.

To provide such a bridging effect and assist in cake formation, the size of the materials contained in a diverting agent is sometimes chosen according to the pore-size and permeability range of the formation intervals. When the materials are chosen according to the size of the voids or cracks in the subterranean formation that is not a desired target for servicing, and as fluid escapes into the formation, the materials accumulate and build a barrier that minimizes or stops further flow.

After a diverting agent is put in place, however, and well servicing has occurred, the effect performed by the diverting agent must usually be reversed to maximize the post-treatment permeability of the serviced interval or intervals such that formation fluids such as hydrocarbons may thereafter be produced. It is thus important that a diverting agent enable quick and easy post-servicing cleanup. If, conversely, a diverting agent remains in formation pores, or continues to coat the formation surfaces, production will be undesirably, and sometimes unacceptably, hindered. The exception to the usual desire for the removal of a diverting agent after servicing is the case where lost circulation is occurring, and where an opening in the geologic formation is of such size that it must be permanently closed.

Typically, then it is desired that diverting agents be degradable, by which is meant that through a chemical reaction or process, or by the physical effects of adjusting the environmental conditions, the diverting agent is caused to be dissipated or debased to the extent that its presence becomes non-detectable, or negligible at most. Actions or events that can cause or promote such degradation include chemical and/or physical factors such as melting, pyrolysis, hydrolysis, solvation, oxidation, or dissolution. If desired, a chemical composition may be introduced into the wellbore to aid in the degradation of a diverting agent, which compositions may include without limitation acidic fluids, basic fluids, solvents, steam or a combination thereof. In some embodiments, a diverting agent that is subjected to such effects may degrade in a time period ranging from about 1 hour to 72 hours. Diverting agents that have been degraded in this manner generally do not require an additional step of retrieving them from the wellbore since they typically do not leave an undesirable residue in the formation.

Polyvinyl alcohol is finding favor as a component in compositions formed for injection or insertion into the subterranean geology traversed by a borehole because its solubility in water and other solvents, in the presence of the different types of environments found in the borehole, can be modified, thus increasing the likelihood that degradation of such a composition can be easily obtained when desired. See, for example, WO2006/088603A1, WO2018/231236A1, WO2019/031613A1, US2020/0071592A1, US2020/0071597A1, US2020/0071599A1, US2020/0071605A1, United States Provisional Appln. Ser. No. 62/967,956 (filed 30 Jan. 2020), U.S. Provisional Appln. Ser. No. 62/967,940 (filed 30 Jan. 2020), and U.S. Provisional Appln. Ser. No. 62/982,199 (filed 27 Feb. 2020).

Polyvinyl alcohol optionally in combination with other materials have also been described as a fluid loss additive for use in cement for cementing oil and gas well bores. See, for example, U.S. Pat. Nos. 5,105,885, 5,207,831, US2006/0041060A1 and EP0587383A1.

Depending on the temperature in the wellbore, such plugging agents may degrade slowly over a period of time; the higher the temperature the faster the degradation. For cooler temperatures and applications where the well must be placed on production quickly, the rate of degradation of many of the diverting agents is too long for any practical use. There is considerable demand for materials that can last during the duration of an operation, which may be from a few hours to a few weeks, followed by a rapid degradation and cleanup to allow for quicker production.

Polyvinyl alcohols have been found particularly suitable for these lower-temperature types of applications; however, degradability can be affected by the presence of other components in the composition or wellbore.

Polyester-based materials, such as polylactic acid ("PLA") and polyglycolic acid ("PGA"), have also been used for diverting applications as they are very stable under most subterranean conditions. As a result, however, these materials do not effectively degrade under normal conditions and require special treatments to effectively remove.

US2016/0215203A1 does disclose using a polylactic acid type material as a crosslinker in a polyvinyl alcohol composition to be used for treating subterranean wellbores. Since a crosslinked material creates a covalently bonded network, however, this publication offers limited guidance concerning how to use a polylactic acid type component in a composition containing a polyvinyl alcohol in ways that do not impair, but rather preferably improve, polymeric properties or characteristics, particularly solubility, that would be most desirable when selecting a polyvinyl alcohol-containing composition as a component in a wellbore treatment fluid.

It thus remains desirable to have particulate polyvinyl alcohol compositions containing a polyester polymer, and processes and methods for providing them, wherein the compositions have improved utility and performance for use in downhole operations as plugging agents, which compositions are characterized by a desirably attractive solubility performance that can be tailored for the particular subsurface environment.

SUMMARY OF THE INVENTION

In view of the above described need in the art to obtain and provide improved PVOH compositions for use in wellbore servicing fluids, it is proposed herein to provide such compositions that are characterized by a desirably broad range of solubilities, and that may thus be more advantageously selected for use in specific downhole treatment situations in view of their relative ease of degradability.

It is therefore proposed, in one aspect of this invention, to provide a particulate composition comprising particles of a blend of:

(a) a polyvinyl alcohol polymer composition comprising one or more polyvinyl alcohol polymers and optionally one or more additives; and (b) an aliphatic polyester polymer composition comprising one or more aliphatic polyester polymers and optionally one or more additives, and (c) optionally one or more additives in addition to additives present in (a) and (b), wherein the blend comprises:

(i) from about 5 wt % to about 95 wt % of the one or more polyvinyl alcohol polymers, and (ii) from about 5 wt % to about 95 wt % of the one or more aliphatic polyester polymers, based on the combined weight of the one or more polyvinyl alcohol polymers and the one or more aliphatic polyester polymers.

In one embodiment, the blend comprises from greater than 45 wt %, or from about 50 wt %, or from about 66 wt %, to about 95 wt %, or to about 80 wt %, of the one or more polyvinyl alcohol polymers, and from about 5 wt %, or from about 20 wt %, up to about 55 wt %, or to about 50 wt %, or to about 34 wt %, of the one or more aliphatic polyester polymers, based on the combined weight of the polyvinyl alcohol polymers and the aliphatic polyester polymers.

In another embodiment, the one or more aliphatic polyester polymers comprise a polylactic acid, a polyglycolic acid, and/or a copolymer prepared from lactic acid and glycolic acid.

In another embodiment, the blend is from a melt blend of (a), (b) and optionally (c).

In another embodiment, the blend is from a solid blend of (a), (b) and optionally (c).

In another embodiment, an aliphatic ester polymer is a discontinuously dispersed phase in a matrix comprising a polyvinyl alcohol polymer.

In another embodiment, this invention provides a particulate composition comprising particles of a blend of a polyvinyl alcohol polymer and an aliphatic polyester polymer, which blend comprises about 15 wt % or more of the polyvinyl alcohol component, and which is soluble to the extent of at least about 25 percent of its weight after being held in water in a glass vessel at 195° F. for 6 hours.

In another aspect, this invention provides a method of making a particulate composition comprising particles of a blend of:

(a) a polyvinyl alcohol polymer composition comprising one or more polyvinyl alcohol polymers and optionally one or more additives; and (b) an aliphatic polyester polymer composition comprising one or more aliphatic polyester polymers and optionally one or more additives, and (c) optionally one or more additives in addition to additives present in (a) and (b), wherein the blend comprises:
(i) from about 5 wt % to about 95 wt % of the one or more polyvinyl alcohol polymers, and
(ii) from about 5 wt % to about 95 wt % of the one or more aliphatic polyester polymers, based on the combined weight of the one or more polyvinyl alcohol polymers and the one or more aliphatic polyester polymers, the method comprising the steps of:
(A) dry mixing (a), (b) and optionally (c) in a mixing device to form a blended composition, and
(B) making particles of the blended composition.

In one embodiment, the mixing device is a melt mixing device to produce a melt blended composition.

In another embodiment, the mixing device is a solid mixing device to produce a particulate mixture, and step (A) further comprises the step of subjecting the particulate mixture to compression to produce a solid blended composition.

In one embodiment, in step (B) the particles are made to a specified particle size distribution, as described in further detail below.

In another aspect, the present invention provides a plugging agent comprising the particulate composition as generally described above and in further detail below, and/or made by the process as generally described above and in further detail below.

In one embodiment, the particulate plugging agent has a particle size distribution wherein:
(i) the portion of 10 mesh on (U.S. Sieve Series) is from about 10 wt %, or from about 20 wt %, or from about 25 wt %, to about 60 wt %, or to about 50 wt %, or to about 40 wt %; and
(ii) the portion of 10 mesh pass and 16 mesh on is from about 40 wt %, or from about 45 wt %, or from about 50 wt %, to about 90 wt %, or to about 80 wt %, or to about 70 wt %; or a particle size ranging from from 3 mesh, or from 4 mesh, to 200 mesh, or to 170 mesh (U.S. Sieve Series); or a particle size of from 3 mesh, or from 4 mesh, or from 5 mesh, to 18 mesh, or to 12 mesh, or to 9 mesh (U.S. Sieve Series).

In another embodiment, the particles of the particulate plugging agent have an average density of about 0.9 g/mL or greater, or about 0.95 g/mL or greater, or about 1 g/mL or greater, or about 1.1 g/mL or greater, or about 1.2 g/mL or greater, about 1.3 g/mL or greater, or about 1.4 g/mL or greater, or about 1.5 g/mL or greater.

In another embodiment, the particulate plugging agent has a bulk density of from about 0.5 g/ml to about 0.8 g/ml.

In another aspect, this invention provides a method of treating a subsurface formation to divert flow of a fluid from one zone of the subsurface formation to another, by pumping into the subsurface formation an aqueous carrier liquid having dispersed therein the particulate plugging agent.

In one embodiment of the method, the plugging agent is temporary and subsequently removed by dissolution.

The compositions of this invention have suitable stability for sufficient time periods to be useful in subterranean formations wherein downhole temperatures can typically range from about 100° F. up to about 250° F., although in most cases, these compositions are used at temperatures up to about 210° F., for example, in the range of from about 190° F. to about 210° F. A particular advantage of the polyvinyl alcohol-based compositions hereof for downhole applications is that they are environmentally friendly since they are temporary, and are considered non-toxic and substantially biodegradable.

These and other embodiments, features and advantages of this invention will be more readily understood by those of ordinary skill in the art from a reading of the following detailed description.

DETAILED DESCRIPTION

Figure 1A:
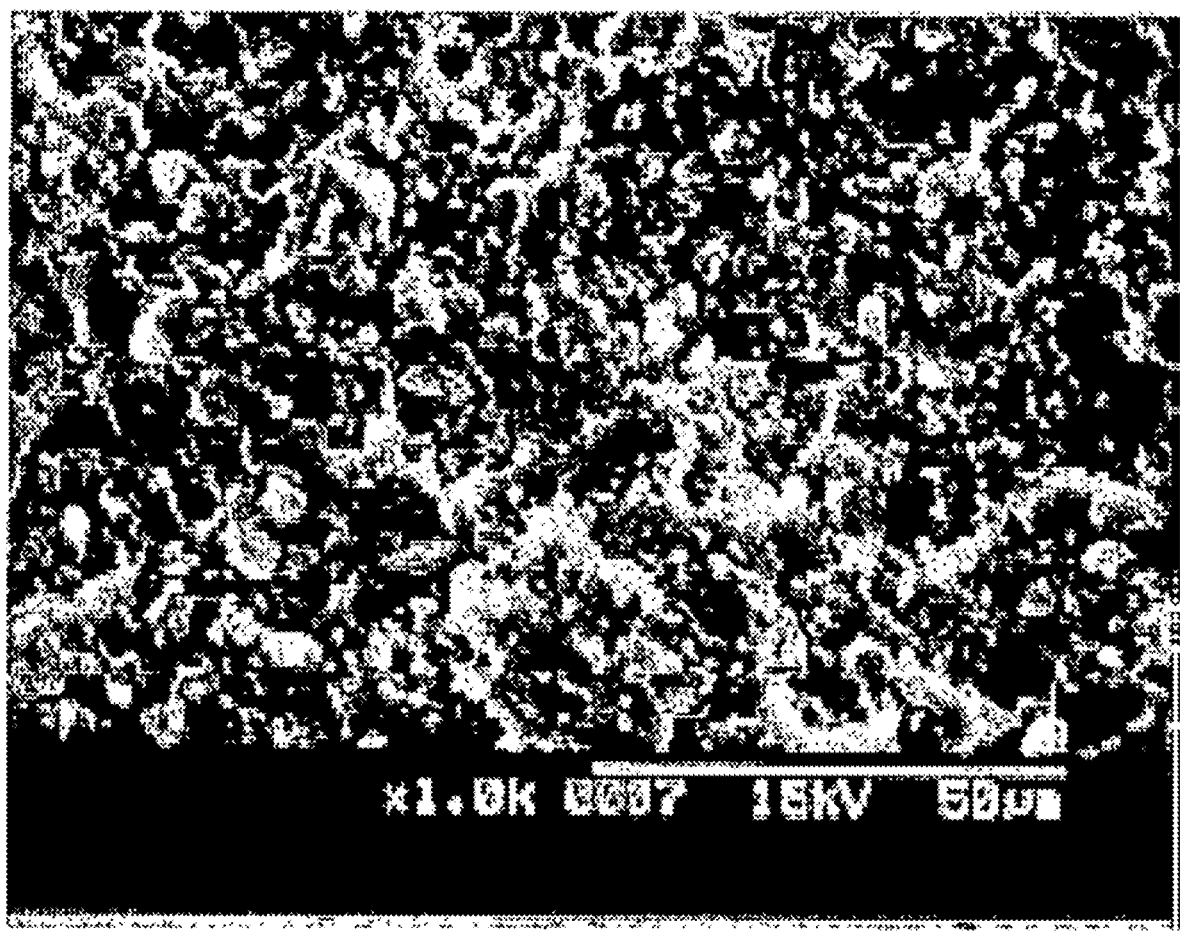
FIGS. 1(A), 1(B) and 1(C) are a set of three SEM photomicrographs, at different magnifications, of a pellet of a melt blend from Example 9.

This invention relates to particulate polyvinyl alcohol polymer compositions that have a solubility performance that is modifiable in view of the polymeric properties and characteristics of the composition. These compositions can be manufactured by means of a variety of processes that can involve, for example, melt processing, and/or can involve granulation, compaction, crushing, and find substantial use in downhole applications in subterranean treatments, and in various manufacturing operations.

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Unless stated otherwise, all percentages, parts, ratios, etc., are by weight.

Unless stated otherwise, pressures expressed in psi units are gauge, and pressures expressed in kPa units are absolute. Pressure differences, however, are expressed as absolute (for example, pressure 1 is 25 psi higher than pressure 2).

In certain instances, a quantitative value set forth herein may be determined by an analytical or other measurement method that is defined by reference to a published or otherwise recognized standard procedure. Typical examples of sources of such recognized standard procedures include ASTM (American Society for Testing Materials, now ASTM International); ISO (International Organization for Standardization); DIN (Deutsches Institut für Normung); and JIS (Japanese Industrial Standards). Unless clearly stated otherwise herein, the specific standard procedure used herein is considered to be the version of that procedure that is in force on the filing date of this application.

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When a range of values is stated as being "less than" or "no more than" a designated quantity (or other equivalent phrasing), it is to be understood that the range is bounded on the low end by an unspecified non-zero value. Correspondingly, when a range of values is stated as being "more than", "greater than", or "not less than" a designated quantity (or other equivalent phrasing), it is to be understood that the range on the high end is not infinite, and that it is bounded on the high end by an unspecified finite value.

When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of claim elements is not necessarily limited to only those elements but can include other elements not expressly listed or inherent to such process, method, article, or apparatus.

The transitional phrase "consisting of" excludes any claim element or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified claim elements, materials or steps and those others that do not materially affect the basic and novel characteristic(s) of the claimed invention. A "consisting essentially of" claim thus occupies a middle ground between closed claims that are written in a "consisting of" format, and fully open claims that are drafted in a "comprising" format. Optional additives as defined herein, at a level that is appropriate for such additives, and minor impurities are not excluded from a composition by the term "consisting essentially of".

Further, unless expressly stated to the contrary, "or" and "and/or" refers to an inclusive and not to an exclusive. For example, a condition A or B, or A and/or B, is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The term "predominant portion", as used herein, unless otherwise defined herein, means that greater than 50% of the referenced material. If not specified, the percent is on a molar basis when reference is made to a molecule (such as hydrogen, methane, carbon dioxide, carbon monoxide and hydrogen sulfide), and otherwise is on a weight basis (such as for carbon content).

The term "substantial portion" or "substantially", as used herein, unless otherwise defined, means all or almost all or the vast majority, as would be understood by a person of ordinary skill in the relevant art in the context used. It is intended to take into account some reasonable variance from 100% that would ordinarily occur in industrial-scale or commercial-scale situations.

The term "depleted" or "reduced" is synonymous with reduced from originally present. For example, removing a substantial portion of a material from a stream would produce a material-depleted stream that is substantially depleted of that material. Conversely, the term "enriched" or "increased" is synonymous with greater than originally present.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising vinyl acetate and 15 mol % of a comonomer", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

As ascertainable from the context, the term "composition" will typically be used to refer to more than one polymer and/or copolymer together, and optionally other types of components blended or admixed therewith, but can permissibly also be used to refer to just one polymer or copolymer by itself.

The term "unit" refers to a unit operation. When more than one "unit" is described as being present, those units are operated in a parallel fashion unless otherwise stated. A single "unit", however, may comprise more than one of the units in series, or in parallel, depending on the context. For example, a thermal treating unit may comprise a first cooling unit followed in series by a second cooling unit.

The term "free-flowing" particles (or agglomerates) as used herein means that the particles do not materially further agglomerate (for example, do not materially further aggregate, cake or clump), as is well understood by those of ordinary skill in the relevant art. Free-flowing particles need not be "dry" but, desirably, the moisture content of the particles is substantially internally contained so that there is minimal (or no) surface moisture.

The term "D(X) particle size" means the diameter at which X % of the sample's mass is comprised of particles with a diameter less than this value. For example, "D(10) particle size" means the diameter at which 10% of the sample's mass is comprised of particles with a diameter less than this value, and "D(90) particle size" means the diameter at which 90% of the sample's mass is comprised of particles with a diameter less than this value.

Mesh sizes of wire screens set forth herein for use in size classification operations are taken from the American Standard Sieve Series (Standard Specification for Woven Wire Test Sieve Cloth and Test Sieves) according to ASTM Standard E11 (2020 version). The sizes of the particles that make up a particulate composition, and thus the particle size distribution thereof, can be determined by processing the composition through a nested set of vibrating sieves, each sieve having a tray floor that is a different mesh size screen, and that is smaller than the screen immediately above it. After all material has fallen through the set of sieves and is either retained on a sieve or has fallen to the bottom collection pan, the weight fraction of the starting composition can be determined for each mesh size by weighing the amount of material that is retained on that screen having such mesh size, thus determining a size gradation for the particles of the composition. The mass of the sample on each sieve is then divided by the total mass to give a percentage of the total retained on each sieve, and which fraction is thus classified by the size of the mesh opening on that screen. In either case, a particle size distribution for the particular polyvinyl alcohol composition source or batch may thus be determined.

When the size of a particle herein is described, for example, as "X mesh size or larger", this means that the particle would not pass through the screen opening for that specifically named mesh size, not that mesh sizes tied to a larger number are also being in that particular instance referred to. Similarly, when the size of a particle herein is described, for example, as "smaller than X mesh size", this means that the particle would pass through the screen opening for that specifically named mesh size, not that mesh sizes tied to a smaller number are also being in that instance referred to.

The term "substantially soluble in water" and "soluble in water" means substantially completely (or completely) soluble in deionized water under the stated conditions.

The term "substantially soluble in brine" and "soluble in brine" means substantially completely (or completely) soluble in brine (i.e. a water solution with NaCl concentration of up to 2.9 wt %) under the stated conditions.

The term "acid-soluble weighting agent" means a material that is soluble in an acidic medium, or reacts in acidic medium to result in a product that is soluble in water. For example, calcium carbonate reacts in an acidic medium to generate calcium salt that is soluble in water.

For convenience, many elements of this invention are discussed separately, lists of options may be provided and numerical values may be in ranges; however, for the purposes of the present disclosure, that should not be considered as a limitation on the scope of the disclosure or support of the present disclosure for any claim of any combination of any such separate components, list items or ranges. Unless stated otherwise, each and every combination possible with the present disclosure should be considered as explicitly disclosed for all purposes.

Although methods and materials similar or equivalent to those described herein can be used in the practice or testing of the present disclosure, suitable methods and materials are described herein. The materials, methods, and examples herein are thus illustrative only and, except as specifically stated, are not intended to be limiting.

Polyvinyl Alcohol Polymers

One of the polymers used in the manufacture of the compositions of this invention is vinyl alcohol based. The compositions hereof can contain polyvinyl alcohol homopolymers and/or copolymers, both of which are in a general sense well-known polymers and are generally commercially available in many forms for a variety of end-uses. A typical polyvinyl alcohol suitable for use herein is described in, for example, previously incorporated WO2018/231236A1, WO2019/031613A1, US2020/0071592A1, US2020/0071597A1, US2020/0071599A1, US2020/0071605A1, United States Provisional Appln. Ser. No. 62/967,956 (filed 30 Jan. 2020), U.S. Provisional Appln. Ser. No. 62/967,940 (filed 30 Jan. 2020), and U.S. Provisional Appln. Ser. No. 62/982,199 (filed 27 Feb. 2020), as well as US2017/0260309A1, US2019/0055326A1, U.S. Pat. Nos. 2,734,048, 3,497,487, 3,654,247 and 4,119,604.

Polyvinyl alcohol is produced on a commercial scale by polymerizing a vinyl ester to generate a polyvinyl ester, after which the ester groups are hydrolyzed to hydroxyl groups in varying degrees. Examples of vinyl esters suitable for use herein as a starting material include vinyl acetate, vinyl propionate, vinyl benzoate, vinyl stearate, vinyl versatate, vinyl pivalate, vinyl formate, vinyl valerate, vinyl caprinate, vinyl laurate, and vinyl carboxylate copolymers, such as ethylene-vinyl acetate copolymer. For reasons of economy, availability and performance, vinyl acetate is preferred. Several different hydrolysis methods, as described below, are well known and can be used for the purpose of completing the conversion to —OH groups of the pendant ester groups in the polymer formed from whatever vinyl ester is chosen as the beginning reactant.

A polyvinyl acetate intermediate, which is the most frequent choice, can be produced by the free radical polymerization of a vinyl acetate monomer in the presence of a polymerization catalyst. The solvent commonly used in the commercial polymerization of vinyl acetate is a hydrolytic alcohol such as methanol, ethanol, the propanols or the monomethyl ether of ethylene glycol. Methanol is preferred. The polymerization is typically conducted in the temperature range of from about 10° C. to about 80° C. The lower end of the polymerization range is known to give products with improved properties. The percent conversion of vinyl acetate to polyvinyl acetate can vary over a wide range. Though conversions ranging from about 20% to 100% have been found satisfactory, commercially at least about 30% conversion is preferable.

The viscosity-average degree of polymerization in the polymer can be adjusted by adjusting variables such as the residence time in the polymerization reaction vessels, the monomer feed rate, the solvent concentration, the initiator concentration and the polymerization temperature. Increasing the residence time in the polymerization reaction vessels, the monomer feed rate, the initiator concentration and the polymerization temperature, and reducing the solvent concentration, will tend to increase the degree of polymerization in the copolymer.

When a vinyl alcohol copolymer is prepared, one or more comonomers may be included in the reaction by which the beginning vinyl ester reactant is polymerized. Without the presence of the comonomers, a PVOH homopolymer would be obtained. The comonomer(s) provided along with the beginning vinyl ester are incorporated into the polymer chain, and remain intact after hydrolysis of the pendant ester groups to —OH groups.

One such commoner is an olefinic monomer, which is typically defined as including unsaturated hydrocarbons that contain one or more double or triple bonds, and are sometimes alternatively referred to as ethylenic or ethylenically unsaturated monomers. Generally, the purpose of the presence of the olefinic comonomer(s) in the vinyl alcohol copolymers is to impart a degree of hydrophobicity to the vinyl alcohol copolymer. Unsaturated monomers containing atoms other than hydrogen and carbon but that nevertheless impart hydrophobicity will also be included in the term "olefinic monomer" as used herein.

Particular examples of suitable olefinic comonomers for use herein (whether straight chain, cyclic, aromatic, or optionally branched) include without limitation ethylene, propylene, $C_4$-$C_{20}$ α-olefins, $C_4$-$C_{20}$ internal olefins, $C_4$-$C_{20}$ vinylidene olefins, $C_5$-$C_{ao}$ cyclic olefins, $C_8$-$C_{20}$ aromatic olefins, and $C_4$-$C_{20}$ dienes, as well as $C_4$-$C_{20}$ functionalized olefins, including derivatives of any of the foregoing containing hetero atoms such as O, S or N. Any of the $C_4$-$C_{20}$ compounds listed in the preceding sentence may instead be a $C_4$-$C_{12}$ or a $C_4$-$C_8$ compound as desired. Examples of suitable olefinic monomers include without limitation ethylene, propylene, 1-butene, 1-pentene, 1-hexene, 4-methylpent-1-ene, 1-heptene, 1-hexene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecyl, 1-eicosene, 2-butene, 4-methyl-1-pentene, ethyl-1-hexene, cyclohexene, norbornene, styrene, methyl styrene, allyl stearate, vinyl stearate, butadiene, mixtures thereof and the like. Preferred are ethylene and $C_3$-$C_8$ α-olefins; more preferred is ethylene.

In addition, combinations of an acid-functional comonomer (as described below) and an olefinic comonomer can also be used.

As noted above, other types of monomers containing hetero atoms are available for use when desired to impart hydrophobicity to a vinyl alcohol polymer, particularly when in admixture with a true hydrocarbon such as ethylene. Examples of such other types of monomers include acrylics, amides and imides, carbonates, esters, ethers, fluorocarbons, vinyl acetals, vinyl and vinylidene chlorides, vinyl esters, vinyl ethers and ketones, propylene oxide, vinylpyridine and vinypyrrolidone.

In yet another embodiment, various "acid functional" comonomers are available for use as comonomers in a PVOH copolymer. Many of these copolymers will exhibit hydrophobicity, or they can be blended with a hydrophobic PVOH if they are found to not possess hydrophobicity themselves to the desired extent. Such acid-functional comonomers include, for example, one or more of (i) a monocarboxylic unsaturated acid, (ii) a dicarboxylic unsaturated acid, (iii) an alkyl ester of (i), (iv) an alkyl ester of (ii), (v) an alkali metal salt of (i), (vi) an alkali metal salt of (ii), (vii) an alkaline earth metal salt of (i), (viii) an alkaline earth metal salt of (ii), (ix) an anhydride of (i), and (x) an anhydride of (ii).

Particular examples of such acid-functional comonomers include methacrylic acid, methyl methacrylate, 2-hydroxyethyl acrylate, hydroxyl methacrylate, ethyl methacrylate, n-butyl methacrylate, maleic acid, monomethyl maleate, dimethyl maleate, maleic anhydride, itaconic acid, monomethyl itaconate, dimethyl itaconate, itaconic anhydride, neodecanoic acid, and vinyl neodecanoate. Preferred are lower alkyl ($C_2$-$C_8$, or $C_2$-$C_4$) acrylates and methacrylates. Non-limiting examples of such comonomers include methyl acrylate, methyl methacrylate, ethyl acrylate, ethyl methyacrylate, i-propyl acrylate, i-propyl methacrylate, n-propyl acrylate, n-propyl methacrylate, i-butyl acrylate, i-butyl methacrylate, n-butyl acrylate, n-butyl methacrylate, t-butyl acrylate, t-butyl methacrylate, ethylhexyl acrylate, ethylhexyl methacrylate and others. Preferred comonomers also include methyl acrylate, methyl methacylate and mixtures thereof, and particularly methyl acrylate. Examples of commercially available polyvinyl alcohols containing acid-functional comonomers include those available under the trade designation Kuraray POVAL™ K-series grades such as 32-97KL, 25-88KL, 6-77KL and 30-94KL (Kuraray Co., Ltd., Tokyo, Japan), or ELVANOL™ 80-18 (Kuraray America, Inc., Houston, Tex. USA).

The content of a comonomer in a polyvinyl ester (such as a polyvinyl acetate), and thus in the resulting polyvinyl alcohol copolymer prepared therefrom, can be at least about 0.1 mol %, or at least about 0.5 mol %, or at least about 1 mol %, and yet not more than about 15 mol %, or not more than about 10 mol %, or not more than about 8 mol %.

In an alternative embodiment involving the particular case of a hydrocarbon olefinic comonomer, however, the content of a hydrocarbon olefinic comonomer in a polyvinyl ester, such as a polyvinyl acetate (and thus in the resulting hydrophobic polyvinyl alcohol copolymer hereof), can be at least about 2 mol %, or at least about 3 mol %, or at least about 4 mol %, and yet not more than about 10 mol %, or not more than about 8 mol %, or not more than about 6 mol %. Examples of commercially available polyvinyl alcohols containing an olefinic comonomer that could be used in line with the invention set forth herein include those available under the trade designation EXCEVAL™ RS2117 copolymer (Kuraray America, Inc., Houston, Tex. USA). By contrast, while nomenclature is not necessarily always dispositive, many products available commercially in the category of "ethylene/vinyl alcohol" copolymer frequently contain an olefinic comonomer therein in an amount of at least about 20 mol %, or at least about 30 mol %, or at least about 40 mol %.

Also included as polyvinyl alcohol polymers to which this invention applies are compositions in which one or more —OH groups on a polymer chain has participated in a reaction to form a derivatized polymer. For example, the —OH groups can form inorganic esters such as when they react with boric acid, borates, lactates, sulfates, vanadyl compounds and/or substituted derivatives thereof, and mixtures of any two or more of the foregoing. Polyvinyl alcohol can also undergo Michaels addition with compounds containing activated double bonds, including for example acrylonitrile, acrylamide and vinyl aldehydes and ketones, including in each case substituted derivatives of, and mixtures of, the named reactants.

In other embodiments, the —OH group of a polyvinyl alcohol can form organic compounds such as the formation of an ester from a carboxylic acid or anhydride (e.g. acrylic or methacrylic acid, or maleic anhydride); the formation of a carbonate from a chloroformate; and the formation of a carbamate from a urea or isocyanate; including in each case substituted derivatives of, and mixtures of, the named reactants. Polyvinyl alcohol can also form an internal ether from the elimination of water, and can form an external ether from a reaction with a $C_2$ or higher, chloro-substituted carboxylic acid or ester thereof, including in each case substituted derivatives of, and mixtures of, the named reactants. Polyvinyl alcohols can also be crosslinked in a reaction with a multifunctional compound such as glyoxal, glutaraldehyde, urea-formaldehyde, melamine-formaldehyde, trimethylolmelamine sodium borate or boric acid, and isocyanates.

In addition to the above modifications of a polyvinyl alcohol polymer, another method for controlling the solubility (and dissolution time) of a particulate composition hereof is by blending a first polyvinyl polymer, such as a polyvinyl alcohol copolymer, with one or more second fully- or partially-hydrolyzed polyvinyl alcohol homopolymers and/or copolymers. Such other polyvinyl alcohols may be chosen to be more soluble than the first polyvinyl alcohol polymer, but typically they are chosen to be less soluble and thus extend the dissolution rate of the compositions comprising the combination.

In one embodiment, a polyvinyl alcohol composition hereof comprises a blend, wherein a first polymer, such as a homopolymer or a polyvinyl alcohol copolymer, is present in the blend in an amount of from about 10 wt %, or from about 20 wt %, or from about 25 wt %, or from about 33 wt %, or from about 40 wt %, to about 90 wt %, or to about 80 wt %, or to about 77 wt %, or to about 67 wt %, or to about 60 wt %, based on the total weight of all polyvinyl alcohol components. In such embodiment, a second polymer is another polyvinyl alcohol that can, for example, be one or more partially- or fully-hydrolyzed polyvinyl alcohol homopolymers. Such polyvinyl alcohol homopolymers are generally commercially available, for example under the brands KURARAY POVAL™ and ELVANOL™ from Kuraray Co., Ltd. (Tokyo, Japan) and its affiliates, and are present in the blend in an amount that makes up the balance of the composition wherein the content of the first and second polyvinyl alcohol polymers totals to 100 wt %.

In another embodiment hereof, the polyvinyl alcohol polymer is a transition product produced in a continuous hydrolysis process. Such transition product is in essence an intimate reactor blend of multiple polyvinyl alcohol grades as would be recognized by one of ordinary skill in the relevant art.

For example, in many commercial continuous polyvinyl alcohol hydrolysis processes, instead of completely stopping the process and cleaning the equipment, the polyvinyl acetate feed is transitioned and/or the reaction conditions are transitioned from grade to grade. At some point, the process starts producing one grade of specified properties then transitions over time to a second grade of specified properties. This interim production is referred to as a transition grade.

In one embodiment, this transition grade is produced by transitioning production of a polyvinyl alcohol copolymer to production of a polyvinyl alcohol homopolymer (or vice versa). In this case, the polyvinyl alcohol homopolymer is less soluble than the polyvinyl alcohol copolymer so that the dissolution rate of the particulate composition can be modified.

In another embodiment, the transition grade is produced by altering the hydrolysis conditions, for example, thermal treatment step and/or level of excess catalyst neutralization, which can result in different solubility polyvinyl alcohols from the same starting polyvinyl acetate.

In another embodiment, the transition grade is produced by transitioning both the starting polyvinyl acetate and the hydrolysis conditions (for example, thermal treatment step and/or level of excess catalyst neutralization).

While the exact composition of the transition grade varies as a function of time, when different polyvinyl starting materials are used the average composition should fall within the blend proportions as described above.

A polyvinyl ester such as a polyvinyl acetate is converted to polyvinyl alcohol via hydrolysis, or alcoholysis, processes, as well known in the art. In such processes, the polyvinyl acetate is contacted with an alkali catalyst such as sodium hydroxide or sodium methylate. The major products of this reaction are polyvinyl alcohol and methyl acetate. Regardless of the hydrolysis process, the resulting polyvinyl alcohols would be expected to have substantially the same monomer makeup and degree of polymerization as the starting polyvinyl acetates.

The solubility of polyvinyl alcohol is influenced by the degree of hydrolysis (i.e. the presence of hydroxyl groups along the polymer chain). As the smaller hydroxyl groups are substituted for the bulkier ester (e.g. acetate) groups along the chain, the opportunity for close packing of the polymeric molecules, for increased interchain attraction between them, and for the tendency to form crystallites, is correspondingly increased. The more closely packed the chains are, the more difficult it is to dissolve polyvinyl alcohol in water.

In general, the degree of hydrolysis can be increased by increasing catalyst concentration; and/or by decreasing the rate of flow of an alcoholysis mixture through the reaction vessels and subsequent processing steps. A higher rate of hydrolysis is also favored by higher temperature, higher concentration of catalyst and lower concentration of acetate byproduct in the alcoholysis reactor, or corresponding conditions in a belt reactor.

In general, the alcoholysis catalyst can be any of the alkaline catalysts such as the alkali metal hydroxides and the alkali metal alcoholates. The alcoholate catalysts, particularly sodium methylate, are especially preferred. The catalyst concentration in the alcoholysis mixture may range from about 0.05%, or from about 0.1%, to about 5%, or to about 1%, by weight of the alcoholysis mixture. Higher catalyst concentrations will tend to increase the degree of hydrolysis. The solvent in the reaction, typically a hydrolytic alcohol, such as methanol, may suitably constitute from about 20, or from about 30, to about 70% of the weight of the alcoholysis reaction mixture. The alcoholysis reaction is typically conducted at a temperature in the range of from about 20° C., or from about 40° C., to about 100° C., or to about 65° C. Higher temperatures are preferred with sodium methylate is used as the catalyst, but lower temperatures are suitable for use when NaOH is used as the catalyst. As it progresses, the alcoholysis reaction can, if desired, be quenched with an acid such as acetic acid.

The degree of crystallinity of polyvinyl alcohol polymers or copolymers can be increased by orientation or annealing. Heating of polyvinyl alcohol at elevated temperatures near its crystalline melting point (about 220° C. to about 230° C.), and cooling slowly, also increases the degree of crystallinity.

In one embodiment of this invention, a polyvinyl alcohol can be prepared by a bulk, solution, suspension, dispersion or emulsion process. In such processes, a polyvinyl alcohol in a gel-like form, which is resistant to dissolving (or "sliming") in water, can be prepared by vigorously mixing alcoholic solutions of a polyvinyl ester and alkali in a mixing chamber such as a tank reactor. The PVOH product is removed from the reactor intact for further processing during which it continues to undergo gelation.

Generally in this type of process, polyvinyl acetate dissolved in methanol is treated with a strongly basic catalyst such as sodium methoxide, and methanolysis commences immediately forming vinyl alcohol units in the polymer and methyl acetate as a byproduct. In general, the alcoholysis reaction will be effected with the hydrolytic alcohol at temperatures ranging from about 20° C., or from about 40° C., to about 100° C., or to about 65° C., and the alcohol is most typically methanol, as noted, but can be other lower alkanols such as ethanol if desired. The pressure should, of course, be sufficient to maintain liquid-phase conditions at the desired temperature for the reaction, and pressures from atmospheric to two or more atmospheres of pressure or higher can be used. The hydrolytic alcohol should be substantially anhydrous, by which is meant that the alcohol will contain not more than about 1 wt % water, and preferably not more than 0.2 wt % water.

The alcohol content of the alcoholysis mixture should be such as to provide a suitable excess of the alcohol. Most generally, the alcohol used will be the alcohol employed for dissolving the ester in the production of the intermediate vinyl ester polymer which is to be alcoholyzed. It will generally constitute from around 40 to 90 percent, preferably 50 to 70 percent, of the weight of the alcoholysis reaction mixture. Conversely, the solids content will generally be 10 to 60 percent, preferably 30 to 50 percent, of the reaction mixture. The by-product of the alcoholysis reaction will be methyl acetate. Such ester can be removed as formed during the alcoholysis or allowed to build up in the alcoholysis medium.

The alcoholysis catalyst can be any of the alkaline catalysts that are effective in catalyzing the alcoholysis such as the alkali metal hydroxides and the alkali metal alcoholates. The alcoholate catalysts, particularly sodium methylate, are especially preferred. The catalyst concentration in the alcoholysis mixture may range from around 0.05 to 5 percent by weight, but preferably will be about 0.1 to 1 percent, of the weight of the alcoholysis mixture.

Instead of a tank reactor as mentioned above, other types of reactors may also be used when preparing a reaction mixture that will be deposited in, on or onto a receptacle (as described below), including without limitation a line mixer, a kneader type mixer, a piston-flow type reactor, a tube type reactors, and a tower type reactor. Examples of suitable tower type reactors include packed towers, perforated plate towers, and plate towers, such as bubble-cap towers. Alternatively, a heat-exchanging type reactor may be suitable for use herein, examples thereof including falling film evaporators, such as plate-fin type evaporators, wetted-wall towers, thin film evaporators, and shell and tube evaporators.

Regardless of the type of reaction device used, little to no change in the appearance of the solution is observed; during the initial portion of this type of reaction. However, as the degree of alcoholysis approaches 40 to 50 percent, the viscosity begins to rise rapidly, and the solution gels. Heavy-duty mixing equipment would ordinarily be required to maintain good mixing, and then, as the alcoholysis proceeds further, to break down the gel into discrete particles. In this type of process, however, continuous processing of a so-called "plug flow" nature is employed such that all increments of the total mixture have essentially the same holdup time, or residence time, in the alcoholysis reaction zone because, as gelation ensues, the reaction mixture is spread out quickly as a film on a moving belt or rotating drum. The reaction mixture deposited in, on or onto the receptacle or carrier forms a body undergoing gelation, and at the point before a significant amount of syneresis has taken place, the body is removed from the belt or drum, and is passed into a granulator, or other apparatus for cutting, comminuting or chopping the gel in any required manner.

Granulating a body undergoing gelation that is formed from a polyvinyl alcohol (co)polymer, or blend thereof with other polymers, provides PVOH granules that are relatively compact and regular in shape. Using a knife or other suitable cutting device, the body may be granulated wherein the granulator can be adjusted to provide a batch of granules at least about 90 wt %, or at least about 95 wt %, or at least about 98 wt %, or at least about 99 wt % of which have a size that is 35 mesh or larger, or 25 mesh or larger, or 18 mesh or larger, or 14 mesh or larger.

In other embodiments, the granulator can be adjusted to provide a batch of granules at least about 90 wt %, or at least about 95 wt %, or at least about 98 wt %, or at least about 99 wt % of which have a size and shape wherein such granules fit within the volume defined by a right cuboid (a rectangular cuboid) having a length that is at least about 2 mm or more, or at least about 3 mm or more, or at least about 4 mm or more, and yet is about 10 mm or less, or about 8 mm or less, or about 6 mm or less; a width that is at least about 1 mm or more, or at least about 2 mm or more, or at least about 3 mm or more, and yet is about 8 mm or less, or about 7 mm or less, or about 6 mm or less; and a height that is at least about 0.5 mm or more, or at least about 0.75 mm or more, or at least about 1 mm or more, and yet is about 2 mm or less, or about 1.5 mm or less, or about 1.25 mm or less. A right cuboid (a rectangular cuboid) in this context is one in which each of the faces is a rectangle and so each pair of adjacent faces meets in a right angle. In the above description of dimensions, the cuboid is considered as being viewed from above where the length is the longest dimension, the height is the shortest dimension, and the value of the width is between the values of the other two dimensions. In the view of the cuboid from above, the length and width form a rectangle, and the height dimension is perpendicular to the plane of the rectangle formed by the length and width, and represents the depth or thickness of such rectangle.

If desired, the granules obtained by granulating a body undergoing gelation can be dried to reduce the content of a monohydric alcohol therein to less than about 5 wt %, or less than about 3 wt %, or less than about 2 wt %, or less than about 1 wt %, or less than about 0.5 wt %. For such purpose, contact dryers, shovel dryers, disk dryers and fluidized bed dryers are all suitable as apparatus in which thermal drying can be carried out. Suitable commercial brands of dryers include for example Bepex® dryers and Nara® dryers. Drying can also take place in the granulator itself, by heating the shell or blowing warm air into it. It is similarly possible to use a downstream dryer, for example a tray dryer, a rotary tube oven, a centrifuge, or a heatable screw. Preferred drying temperatures range from about 50° C. to about 250° C., or to about 200° C., or to about 150° C. The preferred residence time at such a temperature is less than about 30 minutes, or less than about 10 minutes. However, drying will frequently leave at least a trace or negligible amount of monohydric alcohol in the polymer.

Processes for making polyvinyl alcohol granules from a body undergoing gelation are more fully described in previously incorporated U.S. Provisional Appln. Ser. No. 62/967,956 (filed 30 Jan. 2020).

Another process for obtaining vinyl alcohol polymers is the slurry process. In one embodiment of a slurry alcoholysis process, a first solution of typically about 30 wt % to about 60 wt % polyvinyl acetate copolymer in methanol, and a second solution of dilute sodium methylate alcoholysis catalyst in methanol, are continuously fed to an alcoholysis unit wherein the reaction proceeds to produce a first slurry of the alcoholyzed polyvinyl acetate (polyvinyl alcohol) and methyl acetate. Catalyst amount typically ranges from about 0.2 wt % to about 0.5 wt % based on the weight of the reaction mixture. The temperature of the alcoholysis reaction in the alcoholysis unit is typically from about 58° C., or from about 64° C., to about 70° C., or to about 68° C. The pressure within the alcoholysis unit ranges from slightly below atmospheric pressure to slightly above atmospheric pressure, but is typically slightly above atmospheric pressure. The alcoholysis unit contains an agitation means so that the alcoholysis is at least partially conducted under agitation conditions.

When the alcoholysis reaches about 40-50%, the polymer partially precipitates. The insoluble material takes the form of a gel of polymer molecules solvated with methanol. As the solubility decreases by further alcoholysis, the gel becomes tougher and begins to reject the associated solvent molecules. When the alcoholysis is completed, the polymer and solvent are mutually insoluble. If this gel is allowed to stand undisturbed, alcoholysis proceeds and the product is obtained in a massive, unworkable form. However, if the gel is worked mechanically (agitated) during this range above about 40% alcoholysis, the polymer will break down to finely-divided solids insoluble in the alcohol. The collapsing gel traps and sticks together with the fine particles from the previous alcoholysis cycle producing polyvinyl alcohol of a desired "popcorn ball" morphology.

In another embodiment, the alcoholysis unit is made up of a primary alcoholysis vessel where the reaction proceeds to produce a slurry of partially alcoholyzed polyvinyl acetate. The slurry from the primary alcoholysis vessel overflows, typically continuously, to an agitated hold vessel which provides additional residence time for completing the alcoholysis reaction. The slurry from the agitated hold vessel is then pumped through one or more finisher units to react short-circuited polyvinyl acetate, thus ensuring that the conversion is raised to 99.5% or higher of desired completion. Preferred amount of conversion of a polyvinyl acetate starting material is measured as a degree of hydrolysis.

The resulting first polyvinyl alcohol slurry may then optionally be fed to a neutralizing unit along with an acid to fully or partially neutralize remaining alcoholysis catalyst. In one embodiment, the catalyst is substantially neutralized. In another embodiment, less than a predominant portion (less than 50 equivalent %), or less than 25 equivalent %, or less than 10 equivalent %, or less than 5 equivalent %, of any excess alkali catalyst, can be neutralized. Typically, the acid employed is acetic acid. A second slurry is generated from the neutralizing unit. If present, the neutralizing unit can also be used to control the pH of the resulting second slurry. In an alternative embodiment, the neutralizing unit is not present (or is bypassed if present, or is present with substantially no acid feed, or is present with no acid feed), and the excess alkali catalyst is substantially not neutralized (or not neutralized) and remains in first slurry.

In one embodiment, the polyvinyl alcohol polymer is a non-neutralized polyvinyl alcohol polymer, for example, a non-neutralized acid-functional polyvinyl alcohol copolymer, such as a copolymer of vinyl acetate with one or more lower alkyl acrylate ester monomers as disclosed in previously incorporated WO2019/035946A1.

In yet another embodiment, the second slurry resulting from the neutralization unit, if present, or if not present the first slurry, is then fed to an optional thermal treating unit. The temperature of the first slurry, or the second slurry if present, may be elevated or reduced in the thermal treating unit depending on the desired solubility of the resulting polyvinyl alcohol copolymer. If higher solubility is desired, the temperature can be reduced to less than 50° C., or to less than 40° C., or to less than 35° C., or to less than 30° C., or to less than 25° C., or to less than ambient conditions, with the lower temperatures resulting in higher amorphous and less crystalline content. The thermal treatment unit can be a holding tank with mild heating, or no heating or even active cooling so that the temperature of the slurry is increased or reduced between entry and exit. In one embodiment, the thermal treating unit is not present.

In yet another embodiment, the slurry is fed to a solids-liquid separation unit where polyvinyl alcohol is separated from the slurry to generate a polyvinyl alcohol wet cake and separated liquids. The solids-liquid separation unit can be a centrifuge and/or filtration device or other conventional solids-liquid separation device. In an alternate embodiment, the thermal treatment unit and solids-liquid separation unit can be combined in a single unit operation where the residence time of the slurry and solids is sufficient to reduce the temperature of the second slurry to the desired level.

In another embodiment, the process further comprises the step of washing the polyvinyl alcohol wet cake to produce a purified polyvinyl alcohol wet cake, which is then subject to the drying step. The resulting polyvinyl alcohol wet cake can optionally be purified by feeding the wet cake into a washing unit where it is contacted typically with a fresh or recycled methanol stream to remove ash components and other contaminates to generate a purified polyvinyl alcohol wet cake. In order to generate the final particulate agglomerated polyvinyl alcohol particles, the purified polyvinyl alcohol wet cake after centrifugation, or the wet cake if the washing unit is not present or not utilized, is fed to a drying unit where it is dried via conventional means to remove sufficient remaining liquid content so that the resulting particulate agglomerated polyvinyl alcohol copolymer particles can be recovered, preferably as a free-flowing powder.

Additional process details can be had by reference to previously incorporated US2017/0260309A1 and US2019/0055326A1, as well as U.S. Pat. Nos. 2,734,048, 3,497,487, 3,654,247 and general knowledge of those of ordinary skill in the relevant art.

In yet another embodiment, a polyvinyl alcohol may be prepared in a single or twin screw extruder by the alcoholysis of a polyvinyl ester in the presence of a basic catalyst and in the presence of an alkanol as solvent. The alcoholysis of the polyvinyl ester is carried out in the presence of a lower alkanol, preferably an alkanol having 1, 2 or 3 carbon atoms, such as methanol, ethanol, propanol and isopropanol. The alkanol is used in an amount of from about 10 wt %, or from about 20 wt %, to about 50 wt %, or to about 40 wt % (relative to the polyvinyl ester). This alcoholysis process is carried out in the presence of a basic catalyst such as an alkali metal hydroxide or alkali metal alcoholate as the catalyst including, for example, sodium hydroxide, potassium hydroxide, sodium methylate, ethylate and propylate as well as potassium methylate, ethylate and propylate. The amount of the catalyst is usually from about 1 wt %, or from about 6 wt %, to about 10 wt %, or to 9 about wt % (relative to the polyvinyl ester). The concentration of the catalyst solution is appropriately within the range from about 10 wt %, or from about 12 wt %, to about 25 wt %, or to 20 about wt %.

Depending on the type and quantity of the polyvinyl ester, a period of 1 to 5 minutes is required for the trans-esterification reaction. Finally, the polyvinyl alcohol obtained after the trans-esterification reaction is cooled to a temperature of from about 20° C. to about 40° C., then neutralized, washed and dried in the customary manner. The neutralization can be effected by means of a weak inorganic, or preferably organic, acid, for example phosphoric acid or acetic acid. After being neutralized, the polyvinyl alcohol is washed with a lower alkanol of the type mentioned above. The final drying is carried out at a temperature of from about 70° C. to about 175° C., preferably under an inert gas, for example nitrogen. The polyvinyl alcohol product is obtained in the form of a crumbly particulate material which is distinguished by good flow properties. The average particle diameter of the PVOH product of obtained in this manner is usually within the range of from about 0.1 mm, or from about 0.3 mm, to about 1.5 mm, or to about 0.8 mm.

Instead of removing the PVOH product from the extruder for washing and drying, however, a plasticizer (as described below) can be injected to a downstream zone of the extruder, which permits the product to behave as a thermoplastic as it passes through that zone and enables it to be extruded as a strand that can be pelletized. Since PVOH in the unplasticized state has a high degree of crystallinity and shows little or no thermoplasticity before the occurrence of decomposition which starts at about 170° C. (and becomes pronounced at 200° C.), the use of a plasticizer is essential if there is a desire to obtain the PVOH product in the form of a pelletized strand. The same effect can be achieved by removing the product from the reaction extruder and passing it to a second extruder together with a plasticizer for pelletization, and this permits the added option of washing and drying before feeding to the second extruder.

The polyvinyl alcohol pellets can be made into any desired shaped depending on the extrusion die (cylindrical, oval, rectangular, star etc.), but typically they are substantially cylindrical in shape The preferred length of the pellets is from about 2 mm, or from about 3 mm, to about 5 mm, or to about 4 mm. The diameter of the pellets is from about 1.2 mm, or from about 2 mm, to about 5 mm, or to about 4 mm. If the pellet is not cylindrical, then the diameter should be taken as the widest part of the pellet.

The use of extruders in processes for making polyvinyl alcohol polymers is further discussed in, for example, U.S. Pat. Nos. 4,338,405, 4,401,790 and US2020/0071592A1.

The polyvinyl alcohol polymers used in this invention desirably and preferably have the following properties.

Preferred amount of conversion of a polyvinyl ester (e.g. polyvinyl acetate) intermediate material to PVOH is measured as a degree of hydrolysis. The polyvinyl alcohol resin should have a degree of hydrolysis of from about 60 mol %, or from about 65 mol %, or from 70 mol %, or from about 75 mol %, or from about 85 mol %, or from about 90 mol %, or from about 93 mol %, or from about 95 mol %, or from about 98 mol %, or from about 99 mol %, to 100 mol % (maximum). In one specific embodiment, the degree of hydrolysis is in the range of from about 60 mol % to 100 mol %. In another specific embodiment, the degree of hydrolysis is in the range of from about 65 mol % to about 90 mol %. The degree of hydrolysis can be measured in accordance with JIS K6726 (1994).

Preferred volatile components and/or volatile impurities should be present in the polyvinyl alcohol polymer in amount of less than about 2 wt %, or less than about 1.5 wt %, or less than about 1 wt %, based on the total weight of the polyvinyl alcohol resin.

Preferred water content of the polyvinyl alcohol polymer should be less than 2 about wt % (determined according DIN 51777, method of Karl-Fischer).

Preferred methanol content of the polyvinyl alcohol polymer should be less than about 2 wt %, or less than about 1.5 wt %, or less than about 1 wt %, based on the total weight of the polyvinyl alcohol resin.

In general, a polyvinyl ester (such as a polyvinyl acetate), and thus of the resulting polyvinyl alcohol prepared therefrom, can have a weight average molecular weight in the range of at least about 3000, or at least about 20000, or at least about 50000, and yet not more than about 180000, or not more than about 130000, or not more than about 80000.

The viscosity-average degree of polymerization of a polyvinyl ester (such as a polyvinyl acetate), and thus of the resulting polyvinyl alcohol prepared therefrom, can be in the range of at least about 200, or at least about 500, or at least about 1500, and yet not more than about 5000, or not more than about 3750, or not more than about 2250. The viscosity-average degree of polymerization of a polyvinyl alcohol polymer is measured in accordance with JIS K6726 (1994).

In one embodiment, the polyvinyl alcohol polymers (a) can have a degree of solubility in deionized water at a temperature in the range of about 50° C. to about 70° C. of at least about 3 wt %, or at least about 6 wt %, or at least about 12 wt %, and yet not more than about 30 wt %, or not more than about 25 wt %, or not more than about 20 wt %; and (b) can have a degree of solubility in deionized water at a temperature in the range of about 90° C. to about 110° C. of at least about 75 wt %, or at least about 80 wt %, or at least about 85 wt %, up to about 100 wt %, or not more than about 99 wt %, or not more than about 98 wt %.

The polyvinyl alcohol polymers hereof can have a degree of crystallinity of at least about 0.2, or at least about 0.25, or at least about 0.35, and yet not more than about 0.55, or not more than about 0.5, or not more than about 0.4. Degree of crystallinity can be measured according to differential scanning calorimetry (DSC), which is a method of measuring the flow of heat into or out of a material with respect to time or temperature, and can be measured by quantifying the heat associated with melting (fusion) of the polymer. The heat can be evaluated in terms of percent crystallinity by ratioing against a polymer of known crystallinity to obtain relative values, or by ratioing against the heat of fusion for a 100% crystalline polymer sample. DSC is frequently performed with a thermoelectric disk with raised platforms over which the reference (usually an empty pan) and a metal pan carrying a sample are placed. As heat is transferred through the disk, the differential heat flow to the sample and reference is monitored by area thermocouples. The sample temperature can be directly monitored by a sample thermocouple. The presence of a preheated purge gas further provides additional baseline stability in addition to the desired sample/atmosphere interaction. However, polymer crystallinity can also be measured using dilatometry, x-ray scattering, or polarized optical microscopy.

The polyvinyl alcohol copolymers can have an olefinic unit block character of about 0.90 to about 0.99, which indicates non-blockiness, i.e. substantial randomness. Unit block character, or the blockiness index, of a polymer can be calculated from the triad distribution, using the analysis outlined in Halverson, F. et al, *Macromolecules* 18 (6), 1985, 1139-1144. Results obtained according to this approach are usually categorized as follows: 100% block copolymers have a blockiness index value of about 0.0; 100% alternating copolymers have a blockiness index value of about 2.0; and ideally random copolymers have a blockiness index value of about 1.0.

Preferred viscosity of the polyvinyl alcohol polymers hereof, based on a solution of 4 wt % in water (20° C., DIN 53015), is in the range of from about 2 mPa·s, or from about 3 mPa·s, or from about 10 mPa·s, to about 125 mPa·s, or to about 70 mPa·s, or to about 40 mPa·s, or to about 30 mPa·s, or to about 15 mPa·s. The viscosity of a polyvinyl alcohol polymer hereof can be determined on a 4% aqueous solution at 20° C. determined by the Hoeppler falling ball method (ASTM-D 1343-56).

Aliphatic Polyester

The aliphatic polyester used herein can be obtained, for example, by homopolymerization or copolymerization of an oxycarboxylic acid and/or a lactone; by an esterification reaction of an aliphatic dicarboxylic acid and an aliphatic diol; or by copolymerization of an aliphatic dicarboxylic acid, an aliphatic diol, and an oxycarboxylic acid and/or a lactone.

Examples of an oxycarboxylic acid suitable for use for such purpose include aliphatic hydroxycarboxylic acids having from 2 to 8 carbons, such as lactic acid, glycolic acid, malic acid, hydroxypropionic acid, hydroxybutyric acid, hydroxypentanoic acid, hydroxycaproic acid, hydroxyheptanoic acid, hydroxyoctanoic acid, and the like. Examples of suitable lactone include lactones having from 3 to 10 carbons, such as propiolactone, butyrolactone, valerolactone, caprolactone, and the like. Examples of suitable aliphatic dicarboxylic acids include aliphatic saturated dicarboxylic acids having from 2 to 8 carbons such as oxalic acid, malonic acid, succinic acid, glutaric acid, and adipic acid; as well as aliphatic unsaturated dicarboxylic acids having from 4 to 8 carbons such as maleic acid, fumaric acid, and the like. Examples of suitable aliphatic diols include alkylene glycols having from 2 to 6 carbons such as ethylene glycol, propylene glycol, butanediol and hexanediol; as well as polyalkylene glycols having from 2 to 4 carbons such as polyethylene glycol, polypropylene glycol, polytetramethylene glycol, and the like.

The acid, alcohol and other components listed above that can be used to form these polyesters can each be used individually or in a combination of two or more components together.

In other embodiments, aliphatic polyesters used herein may include those generally described by the following structure:

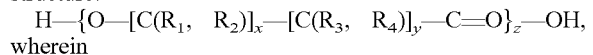

wherein $R_1$, $R_2$, $R_3$, and $R_4$ is each independently H; linear alkyl such as $CH_3$ or $CH_2CH_3(CH_2)$—$CH_3$; branched alkyl; aryl; alkylaryl; a functional alkyl group (bearing, for example, one or more of carboxylic acid groups, amino groups, hydroxyl groups, and thiol groups); or a functional aryl group (bearing, for example, one or more of carboxylic acid groups, amino groups, hydroxyl groups, and thiol groups);

x is an integer between 1 and 11;

y is an integer between 0 and 10; and z is an integer between 2 and 50,000.

Preferred examples of an aliphatic polyester, suitable for use herein and obtainable as set forth above, include hydroxycarboxylic acid-based aliphatic polyesters such as polylactic acid ("PLA") and polyglycolic acid ("PGA"); lactone-based aliphatic polyesters such as poly-ε-caprolactone; diol-dicarboxylic acid-based aliphatic polyesters such as polyethylene succinate and polybutylene succinate; copolymers thereof, such as glycolic acid-lactic acid copolymers ("PGLA"); copolymers in which either one or both of lactic acid and glycolic acid are polymerized with itself/themselves and other hydroxy-acid-containing moieties; mixtures of any of the foregoing; and the like. Aliphatic polyesters that use combinations of aromatic components such as polyethylene adipate/terephthalate may also be used.

Lactic acid contains a chiral carbon atom, and thus exists in L- and D-enantiomeric forms. Examples of the polylactic acid that can be used in this invention thus include, without limitation, poly-D-lactic acid (PDLA), poly-L-lactic acid (PLLA), a random copolymer of L-lactic acid and D-lactic acid, and a stereo complex of L-lactic acid and D-lactic acid. All these co/polymers can be used alone or in combination. PLA thus encompasses not only homopolymers of L-lactic acid or D-lactic acid as mentioned; but also copolymers in which L-lactic acid or D-lactic acid repeating units are each present in an amount, for example, of not less than about 15 mol %, or not less than about 20 mol %, or not less than about 40 mol %, or not less than about 60 mol %, and yet not more than about 85 mol %, or not more than about 80 mol % of the copolymer, or not more than about 60 mol %, or not more than about 40 mol %, wherein the sum of the contents of L-lactic acid or D-lactic acid and any other moieties polymerized into the chain or a branch total to 100 mol %. Such copolymers can be either random or block copolymers. PLA can also include stereocomplex polylactic acids, obtained by forming a stereocomplex by mixing a poly-L-lactic acid and a poly-D-lactic acid, for example in solution by the application of such methods as solvent evaporation, precipitation, solvent temperature reduction, or spray droplet atomization.

The proportions and distribution of the L- and D-units has a significant effect on the properties of polylactic acid. When one of the enantiomer types is highly predominant, the polylactic acid is capable of being crystallized to form a semi-crystalline material. When both types of enantiomeric units are present in significant amounts and are randomly distributed, the polylactic acid is an amorphous material that can be crystallized only with difficulty. The line of demarcation between the crystallizable grades of polylactic acid and the amorphous grades is at about 8-10 mol % of the less predominant enantiomer. Random copolymers that contain at least 8-10 mol % of each of the L- and D-enantiomers tend to be amorphous. Random copolymers that contain less than about 8-10 mol % of either the L- or D-enantiomer tend to be more easily crystallizable. Polylactic acid resins thus become more easily crystallized as the mol % of the predominant enantiomer increases towards 100%.

PGA encompasses not only homopolymers of glycolic acid, but also random or block copolymers containing, for example, not less than about 60 mol %, or not less than about 70 mol %, or not less than about 80 mol %, or not less than about 90 mol %, of glycolic acid repeating units.

Aliphatic polyesters as used herein can also include random or block glycolic acid-lactic acid copolymers in which glycolic acid and lactic acid repeating units are each present in an amount, for example, of not less than about 20 mol %, or not less than about 40 mol %, or not less than about 60 mol %, and yet not more than about 90 mol %, or not more than about 70 mol %, or not more than about 50 mol % of the copolymer, wherein the sum of the contents of glycolic acid and lactic acid units total to 100 mol %.

In another embodiment, an aliphatic polyester can be grafted with a polar monomer or a mixture of monomers enhances compatibility with polyvinyl alcohol in order to obtain superior processing and superior mechanical and physical properties. An aliphatic polyester, PLA for example, can be modified by grafting with one or more hydrophilic functional groups, such as one or more selected from the group consisting of hydroxylethyl methacrylate (HEMA), poly(ethylene glycol) (PEG), vinyl alcohol, allyl alcohol, methacrylic acid, acrylic acid, hydroxypropyl methacrylate, hydroxypropyl methacrylamide, and n-vinyl pyrrolidone.

The aliphatic polyester used herein is typically, although need not always be, a linear polymer, and can have a degree of polymerization that is, for example, at least about 5, or at least about 50, or at least about 500, and yet is not more than about 5000, or is not more than 2500, or is not more than 1000. It can have a weight average molecular weight that is, for example, at least about 250, or at least about 2500, or at least about 15000, and yet is not more than about 150000, or is not more than about 75000, or is not more than about 15000. It can have a melting point that is, for example, in the range of about 135° C. to about 175° C., and a glass transition temperature that is in the range of about 50° C. to about 75° C. It can have a density that is, for example, in the range of about 1.2 to about 1.5 g/cm$^3$. Two or more different aliphatic polyesters can be used together as the aliphatic polyester component in the compositions of this invention. Aliphatic polyesters suitable for use in this invention can be obtained, for example, from NatureWorks LLC, Minnetonka, Minn.

Additives

A composition of this invention may also optionally include one or more additives, which additives may include, for example, fillers (such as acid-soluble weighting agents), plasticizers (as mentioned above), starches, slip additives, antioxidants, pigments, dyes, as well as mixtures thereof.

Certain of these additives can be present as part of the polyvinyl alcohol polymer composition, certain can be part of the aliphatic polyester polymer composition, and certain can be added separately.

For example, fillers may be blended with the resin component to enhance mechanical properties and regulate the solubility curves of the compositions of this invention. The total amount of filler added can vary widely depending on the desired property modification, for example, up to about 50 wt %, or up to about 30 wt %, or up to about 5 wt %, based on the total weight of the compositions.

In many instances where a composition hereof is being used for downhole treatments, it is desirable to have the specific gravity of the composition be close to that of a carrier fluid in order to allow for pumping and satisfactory placement of a diverting agent or loss circulation control compositions using the selected carrier fluid. A weighting agent can be used for such purpose.

When used, an acid-soluble weighting agent filler can be blended with the polymers, before, during or after polymer blending. Weighting agent generally refers to any additive used to increase the density of the resin component. Acid-soluble weighting agents generally include substances such as natural minerals and inorganic and organic salts. For example, the weighting agent can comprise a metal ion selected from the group consisting of calcium, magnesium, silica, barium, copper, zinc, manganese and mixtures thereof, and a counterion is selected from the group consisting of fluoride, chloride, bromide, carbonate, hydroxide, formate, acetate, nitrate, sulfate, phosphate and mixtures thereof. Specific examples of such fillers include minerals such as $CaCO_3$, $CaCl_2$) and ZnO.

In yet another embodiment, this invention provides a composition suitable for use in downhole treatments that includes a blend of a polymer component and a starch. Such blend can typically comprise from about 10 to about 90 parts by weight of the polymer component and from about 90 to about 10 parts by weight of a starch, based on 100 parts by weight of the combination. Preferably, however, there should be at least about 30 parts by weight polymer component in any starch blend. Suitable starches for use in the present invention include natural starches, synthetic starches, physically modified starches, chemically modified starches and mixtures thereof.

Plasticizers may be included in manufacturing of the compositions of this invention to improve the flow characteristics of the polyvinyl alcohol. In order to obtain a uniform plasticizer coating it is preferred to utilize a spray mechanism to coat the particles of the polymer(s) of the composition. A secondary effect of such plasticizers is to reduce any dusting issues with the particulate compositions, or during the preparation of the particulate compositions.

Materials commonly used as plasticizers for polyvinyl alcohols are generally known to those of ordinary skill in the relevant art, and are generally commercially available. Suitable plasticizers include, for example, compounds such as water, glycerol, polyglycerol, ethylene glycol, polyethylene glycols, ethanol acetamide, ethanol formamide, and acetates of triethanolamine, glycerin, trimethylolpropane and neopentyl glycol, and mixtures of two or more of the above. The preferred polyglycol used as an anti-dusting agent in this invention is polyethylene glycol having a molecular weight (Mn) of about 200 and 600 due to its superior dust suppressant properties after extreme temperature recycling.

Plasticizers that are solid or crystalline at ambient temperatures, such as trimethylolpropane, may be dissolved in water, or another liquid medium that will not offset the plasticization effect, for use as a sprayable plasticizer. Alternatively, however, a plasticizer can be mixed with the polyvinyl alcohol component(s) of a composition hereof when both are dissolved or dispersed in a liquid, or when both are in dry form. When a plasticizer is mixed with polyvinyl alcohol(s) in liquid, the resulting mixture will have to be dried to form a particle containing plasticized polyvinyl alcohol before other steps are taken, such as compaction of the dried mixture. When a polyvinyl alcohol composition containing a plasticizer is compacted, the plasticizer can be added to the composition before or after the compacting step. When a polyvinyl alcohol composition containing a plasticizer is compacted and the plasticizer is added to the composition after compaction into an object, and after granulation of the object, the plasticizer can be added before or after the step of granulation. In one embodiment, the polyvinyl alcohol polymer composition is a thermoplastic polyvinyl alcohol polymer composition comprising one or more polyvinyl alcohol polymers and a plasticizer, for example, as disclosed in previously incorporated US2020/0071592A1.

Typically, the polyvinyl alcohol polymer composition will contain a plasticizer, and the amount of plasticizer used can vary up to about 40 wt %, or up to about 30 wt %, or up to about 20 wt %, based on the weight of the polyvinyl alcohol polymer composition. In other embodiments, the amount of plasticizer used in the polyvinyl alcohol polymer composition can be in the range of about 0.5 wt %, or about 1 wt %, to about 15 wt %, or to about 10 wt %, or about 6 wt %, or to about 4 wt %, based on the total weight of the polyvinyl alcohol polymer composition.

In one embodiment, a polyvinyl alcohol polymer composition that yields a combination of good solubility properties and density comprises: (a) from about 60 wt % to about 94 wt % polyvinyl alcohol polymer(s); (b) from about 5 wt % to about 40 wt % acid-soluble weighting agent; and (c) from about 1 wt % to about 15 wt % plasticizer, based on the combined weight of (a), (b) and (c).

Plasticizers maybe optionally added to the polyesters in an amount sufficient to increase the pliability of the polyesters component at the desired temperature. The plasticizer can be used to decrease the Tg of the polymer and allow the polymer to be designed into a desirable malleable particulate. In some embodiments of this invention, the plasticizers are present in an amount in the range of from about 0.5% to about 30% by weight of the polymer. Examples of plasticizers useful for this invention include, but are not limited to, polyethylene glycol (PEG), polypropylene glycol, polyethylene oxide, glucose monoesters, fatty acid esters, glycerol, glycerin diacetate monocaprylate, polypropylene and combinations thereof.

A monovalent metallic salt can be added to reduce the consequences of an acidic (high multivalent salt content) wellbore environment, such as disclosed in previously incorporated U.S. Provisional Appln. Ser. No. 62/967,940 (filed 30 Jan. 2020). The metallic part (cation) of the monovalent metallic salt (B) is preferably selected from lithium, sodium and potassium. The salt part (anion) of the monovalent metallic salt (B) is preferably selected from phosphate, carbonate and acetate. Preferred monovalent metallic salts are potassium carbonate, potassium phosphate, and sodium acetate, and mixtures thereof. Combinations of more than one monovalent metallic salt are also suitable. The content of the monovalent metallic salt is preferably from about 0.1, or from about 0.2, or from about 0.8, or from about 1.4, to about 20, or to about 15, or to about 10, or to about 8, parts by weight per 100 parts by weight of polyvinyl alcohol polymer(s).

One or more additives in addition to those named can be incorporated into the compositions as necessary when they are used for downhole treatments. These optional additives include without limitation chelators, anti-oxidants, other pH-adjusting agents, oxidizing agents, other lost circulation materials (such as described in the previously incorporated references), scale inhibitors, corrosion inhibitors, clay control additives, iron control additives, reducers, oxygen scavengers and the like.

Preparation of Blends and Particle Size Control

The blended compositions disclosed herein can be prepared by mixing particles (such as pellets, powder and/or other granular forms) of an aliphatic polyester polymer composition, a polyvinyl alcohol polymer composition and optional additives.

One way of mixing is by melt mixing. Such melt mixing can be carried out at typical thermoplastic processing temperatures in the range, for example, of from about 180° C. to about 210° C., on any of variety of known melt mixing devices such as extruders or pumped static mixers. Where it is desired to mix an aliphatic polyester herein with a PVOH that does not possess thermoplastic characteristics, this can also be accomplished with melt mixing equipment through the carefully timed addition of an appropriate plasticizer to the process since, as noted above, PVOH in the unplasticized state has a high degree of crystallinity and shows little or no thermoplasticity before the occurrence of decomposition, which starts at about 170° C. (and becomes pronounced at 200° C.). The output of melt mixing an aliphatic polyester and a PVOH resin to form a composition hereof is typically a pellet of conventional size and shape, which are obtained forming a strand from the melt, cooling and cutting the strand. The size and shape of the pellet are controlled by the shape of the exit die and regulation of the strand cutter.

It is also possible, however, to mix an aliphatic polyester polymer composition with a polyvinyl alcohol polymer composition and optional additives by solid mixing followed by compaction to form a composition of this invention. This may be suitable or even preferred, for example, when using PVOH supplied either from granulation of a body undergoing gelation, or as a powder obtained from a slurry process. In such instance, particles of an aliphatic polyester (such as pellets, granules and/or powders) and particles of a polyvinyl alcohol polymer (such as pellets, granules and/or powders), optionally premixed with one or more optional additives, and other optional additives, are all fed to a compaction device, such as a double roll compactor, which places the component(s) to be compacted under extreme pressure. Where the blended component(s) adhere to themselves in the compaction process, no additional binder may be needed to agglomerate the mixture into a compacted object. In other words, the various aliphatic polyester and polyvinyl alcohol components of the compositions hereof may function as their own binder for the agglomerate. Alternatively, however, as discussed above, additives such as fillers, starches and plasticizers may be added to the composition as necessary to enhance the agglomeration of the component(s) thereof. Desirably such compaction and any ensuing pulverization, is a dry process that does not require an additional drying step.

When a double roll compactor is used, the mixture is fed between two counter-rotating roll presses. Roll compactors with smooth rolls compact a powdered material into an object such as a sheet with consistent hardness. A roller style press combines torque, via a roll drive system, and thrust, via cylinders in a stressed frame, to agglomerate fines. Agglomeration involves a process, in which two counter-rotating rolls press granular material into larger pieces by pulling or pushing fine material into the nip zone of a dual roll press whereupon the rolls pull the material through the roll nip, and produce dense output. The agglomerated materials put out by a double roll compactor typically form an object such as a sheet, ribbon or flakes, have a reduced surface area, and have an increased product bulk density. The rolls apply extreme pressure to press the mixture into a sheet- or ribbon-like form. In other embodiments, the object formed by compaction can also be described, for example, as a block, chunk, hunk, lump, strand, cable, cylinder, briquette, or other type of three-dimensional shape, mass or workpiece. Desirably, the pressure applied during compaction is at least about 20 ksi, or at least about 10 ksi, or at least about 7.5 ksi, or at least about 5 ksi, wherein "ksi" refers to kilopounds per square inch (1 ksi=1T). After a certain pressure point, the compaction reaches an effective maximum where there is very little increase in density per unit of additional pressure. In one embodiment, this effective maximum is about 30 ksi of pressure. Other types of specialized compactors that can be used for compaction of the compositions hereof can also include a briquetter or a single station press.

Once a composition hereof has been subjected to compaction, especially on a roll mill, the sheet output of the compaction process is passed to a crusher. Where compaction is performed by a roll mill, the crusher is often incorporated directly into the same piece of equipment as the roll mill. The crusher will crush or pulverize the compacted sheet to powdered or granulated particles of a predetermined size range wherein such particles are random in shape but, preferably, are reasonably uniform in size and have a relatively narrow size distribution around a target size. The size regulator on the crusher can be adjusted such that it produces powdered or granulated particles at a selected, desired size range, such as any of the mesh size ranges set forth below. A screening device can sort the particles according to size, and send any that are smaller than a predetermined lower limit back to the compactor, and send any that are larger than a predetermined upper limit back to the crusher. In cases where it is possible to use a briquetter or single station press to make particles in a desired size range directly from compaction, it may not be necessary to further process the particles on a crusher.

The step of crushing a compacted sheet may be performed with a variety of equipment as known in the art, and as suitable to a particular situation, such as a bead mill, ball mill, jet mill, rod mill, hammer mill or pin mill. A hammer mill, for example, may have cutting blades with either a knife edge for a cleaner cut or a blunt edge for greater impact and breaking force. Once the output of crushed particles of the composition hereof has been collected from the crusher, those particles, which will have a variety of shapes and sizes, can be packaged as a mixed group and used as is for any desired application such as the remediation of a leaking borehole, as described elsewhere herein. Alternatively, however it is possible at that time, if desired, to segregate the particles by size.

Size classification of particles can be performed with a sieve device, and the output of the size classification makes possible the collection of the particles of the composition in the form of separate groups of particles, each group containing only particles that fall within one particle size range. Size classification, or grading or sorting a batch of crushed particles according to size, is typically performed on a mechanical shaker having the ability to obtain separation using sieves. A typical sieve separator involves a nested column of sieves, each sieve being formed from wire mesh cloth or screen. The sieve in the top pan has the largest mesh openings, and each succeeding pan below has progressively smaller size mesh openings such that each lower sieve in the column receives particles that were not retained on the larger mesh openings of the sieve immediately above it. At the base is a round pan with no openings, called the receiver, which collects all particles that were too small to be retained on any of the sieve screens above. The sieve openings, or mesh sizes, of the various screen-bottomed pans can be selected to be the same as the various sizes of particles desired for use in preparing compositions, and each pan of such selected size will retain particles that are large enough that they do not fall through. The column is vibrated by a mechanical shaker, usually for a fixed amount of time, and the shaking action gives the particles in the batch that was originally placed on the top screen enough motion to either be retained on a screen or fall through to the bottom collector pan. Those that do not fall through form the supply of particles of the selected sizes to be used as mixing components. In an alternative embodiment of any of the methods or compositions set forth above, there may be further provided a step of contacting the particles hereof with a plasticizer prior to sorting the particles according to size. . .

If the particles retained on each pan are removed and stored separately according to size, this enables providing a method of preparing a composition hereof by combining selected amounts of previously crushed particles of the composition having known sizes. To prepare a composition in such manner, selected amounts of particles of the composition are combined in admixture according to a formulated recipe, where each different amount of particles has a different, known size. The required amounts of the particles of different size are withdrawn from the inventory of sized particles created by a sieving operation wherein screens of mesh sizes are used matching the sizes desired to be available in the inventory. The groups of particles of different sizes withdrawn from inventory and assembled according to the formulated recipe can then easily be dry blended to form the composition. As large an inventory as desired of particles of different sizes, for use in selected amounts in the preparation of compositions, can be prepared by running the sieve operation more than once using a combination of screens of a variety of different size ranges. The same procedure is followed of gathering the supply of particles on each screen and storing all particles retained on the screen separately according to size to serve as the stock for supplying particles of all the different sizes needed to formulate compositions. This approach provides great flexibility when determining what relative amounts of particles of what size it is desired to have in a preferred composition, and enables providing a composition of this invention in the form of a mixed combination of groups of varying, but controlled, amounts of particles in the small, medium and large size ranges, and thus to provide a particle size distribution for the composition that is relatively dense.

There is thus provided a method of preparing particles of the compositions hereof by mixing components of the composition by compaction to produce a slab, crushing the slab to produce particles, and classifying the particles according to size. As a result, particles of different sizes can be used to prepare the composition hereof by selecting desired amounts of particles of different but preferred sizes, and mixing those particles together.

In one embodiment, for example, the compositions resulting from the admixture of such size-classified particles can produce a composition hereof that contains (i) a selected amount of particles that are smaller than 80 mesh size and yet are 325 mesh size or larger, and/or (ii) a selected amount of particles that are 80 mesh size or larger. In another embodiment of the foregoing composition, the particles having a size such that they fall into one or both of the immediately preceding ranges can constitute at least about 2 wt %, or at least about 3 wt %, or at least about 5 wt %, or at least about 10 wt %, and yet no more than about 20 wt %, or no more than about 18 wt %, or no more than about 15 wt %, or no more than about 12 wt % of the total weight of the composition.

In another embodiment, the compositions resulting from the admixture of size-classified particles can produce a composition hereof that contains a selected amount of particles that are 35 mesh or larger, or are 25 mesh or larger, or are 18 mesh or larger, or are 14 mesh or larger. In yet another embodiment, the particles having a size such that they fall into the immediately preceding size ranges can constitute at least about 90 wt %, or at least about 95 wt %, or at least about 98 wt %, or at least about 99 wt % of the total weight of the composition.

In another embodiment, the compositions resulting from the admixture of size-classified particles can produce a composition hereof that contains a selected amount of particles that are 80 mesh or larger, or are 60 mesh or larger, or are 14 mesh or larger. In yet another embodiment, the particles having a size such that they fall into the immediately preceding size ranges can constitute at least about 80 wt %, or at least about 85 wt %, or at least about 90 wt %, or at least about 95 wt % of the total weight of the composition.

The different compositions disclosed herein, or formed by the processes disclosed herein, may in various other embodiments that are alternatives to, or alternative aspects of, particle size characterizations set forth elsewhere above, have a particle size distribution described by one or more of the following size ranges:

A composition wherein at least about 97.5 wt %, or at least about 99 wt %, or at least about 99.5 wt %, of the particles of the composition have a particle size of 325 mesh or larger.

A composition wherein at least about 96 wt %, at least about 98 wt %, or at least about 98.5 wt %, of the particles of the composition have a particle size of 200 mesh or larger.

A composition wherein at least about 95 wt %, or at least about 97 wt %, or at least about 98 wt %, of the particles of the composition have a particle size of 140 mesh or larger.

A composition wherein at least about 85 wt %, or at least about 90 wt %, or at least about 95 wt %, of the particles of the composition have a particle size of 80 mesh or larger.

A composition wherein at least about 80 wt %, or at least about 85 wt %, or at least about 90 wt %, of the particles of the composition have a particle size of 50 mesh or larger.

A composition wherein at least about 75 wt %, or at least about 80 wt %, or at least about 85 wt %, of the particles of the composition have a particle size of 35 mesh or larger.

A composition wherein at least about 65 wt %, or at least about 70 wt %, or at least about 75 wt %, of the particles of the composition have a particle size of 20 mesh or larger.

A composition wherein at least about 55 wt %, or at least about 60 wt %, or at least about 65 wt %, of the particles of the composition have a particle size of 12 mesh or larger.

In yet another embodiment of a composition hereof, the particle size distribution of the particles of the composition may be described by a set of values falling within the stated content ranges for a combination of any two or more of all of the mesh screen sizes listed in this application.

In another embodiment, a composition of this invention may have a content of free dust or fines of the composition in an amount of less than about 3%, or less than about 2.5%, or less than about 2%, or less than about 1.5%, or less than about 1%. Content of free dust or fines may be determined quantitatively as the weight percent of free dust or fines of a sample of the composition that could be eluted from the sample with $4.7 \times 10^{-4}$ m$^3$/s (1.0 cfm) of air in 5 minutes using an open "ACE" B (70~100 micron) porosity fritted funnel as the sample receptacle. The process for determining the content of free dust or fines in a sample is more fully described in U.S. Pat. No. 4,389,506.

In any of the compositions hereof that are described herein by particle size range, there can, if desired, be added the further feature that the particles thereof can be dried to reduce the content of a monohydric alcohol therein to less than about 5 wt %, or less than about 3 wt %, or less than about 2 wt %, or less than about 1 wt %, or less than about 0.5 wt %. For such purpose, contact dryers, shovel dryers, disk dryers and fluidized bed dryers are all suitable as apparatus in which thermal drying can be carried out. Suitable commercial brands of dryers include for example Bepex® dryers and Nara® dryers.

In any of the methods as described above, the type and amount of particles to be added is desirably determined in a manner to balance the content of the other size fractions in the composition to give a composition that has a negligible amount of dust but that does not have a disproportionate amount of large particles either, as dictated by the needs of the intended use of the composition. Thus a composition having a relatively dense particle size distribution or gradation may be provided in which most of the particles are in the medium to large size ranges but there are still enough small particles to fill the voids between the larger particles.

The particles of the particulate composition generally have an average density of from about 0.9 g/mL or greater, or about 1 g/mL or greater, or about 1.1 g/mL or greater, or about 1.2 g/mL or greater, about 1.3 g/mL or greater, or about 1.4 g/mL or greater, or about 1.5 g/mL or greater. Usually, such average density will be about 1.5 g/mL or less.

The particulate compositions hereof generally have a bulk density of at least about 0.3 g/cm$^3$, at least about 0.4 g/cm$^3$, at least about 0.5 g/cm$^3$, or at least about 0.6 g/cm$^3$, and yet no more than about 0.8 g/cm$^3$, or no more than about 0.6 g/cm$^3$, or no more than about 0.5 g/cm$^3$. Bulk density is measured according to ASTM 1895C-17.

Compositional Properties

As discussed elsewhere herein, the compositions of this invention are useful for the purpose of remediating the borehole of a production well by the use downhole to temporarily plug a leaking formation. A composition, when used downhole, must have a finite life determined by its degradability, primarily its solubility, because a formation having a leak to be plugged during drilling or servicing operations must later be able to flow freely during production. In instances where an aliphatic polyester has previously been used for downhole remediation, its degradability, i.e. the ease of removing it from the formation, has appeared to be suboptimal. In particular, studies have indicated that polylactic acid and polyglycolic acid both require an extended time, perhaps weeks, to reach 50% degradation when the temperature of its environment is less than 150° F. This is likely caused by the fact that at low temperatures (such as those in the range of about 60° F. to about 150° F.), the rate of hydrolysis of a particulate aliphatic polyester is very low.

Regardless of the precise mechanism that inhibits an aliphatic polyester itself from displaying faster self-degradation, it has been determined herein that the presence of a PVOH component in a blended composition with an aliphatic polyester produces a composition that is readily hydrolytically degradable and water soluble. It is believed that this behavior may result from the fact that a composition hereof is degraded by a dual degradation mechanism (hydrolysis and water dissolution), and that the water absorption of a composition hereof increases as the concentration of the polyvinyl alcohol in the blend is increased. PVOH appears to have the ability to accelerate the degradation of an aliphatic polyester by increasing the hydrophilicity of a blend thereof, and by breaking the crystallinity of the aliphatic polyester. The hydroxyl functional groups of a PVOH can readily form hydrogen bonds with the ester groups of aliphatic polyester, which favors the compatibility of those components in a blended composition. Since the degradation of a composition hereof can be easily effected when required in the borehole, the formation plug provided by the composition can be easily removed with leaving significant residue, if any.

Regardless of the precise mechanism on which the useful degradability of a composition hereof is based, polyvinyl alcohol is desirably provided herein as a blend component to improve the degradability performance of an aliphatic polyester. The two components can be combined in respective amounts that cover a broad range, and methods of the use of melt blending or compaction to make the compositions of this invention are set forth above.

In general, the particulate compositions hereof can be prepared from a blend of from about 5 wt % to about 95 wt % of polyvinyl alcohol polymer(s), and about 5 wt % to about 95 wt % of aliphatic polyester polymers, based on the combined weight of the polyvinyl alcohol polymers and the aliphatic polyester polymers. In one embodiment, the blend comprises from greater than 45 wt %, or from about 50 wt %, or from about 66 wt %, to about 95 wt %, or to about 80 wt %, of the one or more polyvinyl alcohol polymers, and from about 5 wt %, or from about 20 wt %, up to about 55 wt %, or to about 50 wt %, or to about 34 wt %, of the one or more aliphatic polyester polymers, based on the combined weight of the polyvinyl alcohol polymers and the aliphatic polyester polymers. In one embodiment, the blend comprises about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt % of the one or more polyvinyl alcohol polymers, and/or about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt % of the one or more aliphatic polyester polymers, based on the combined weight of the polyvinyl alcohol polymers and the aliphatic polyester polymers. In one embodiment, the blend comprises about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt % of the one or more polyvinyl alcohol polymers, and/or about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt % of the one or more aliphatic polyester polymers, based on the particulate composition described herein.

In another embodiment, the polyvinyl alcohol polymer composition can be used in an amount of more than about 10 wt %, or more than about 12 wt %, or more than about 15 wt %, or more than about 35 wt %, or more than about 45 wt %, or more than about 50 wt %, or more than about 60 wt %, or more than about 70 wt %, or more than about 80 wt %, or more than about 90 wt %, with the balance of the composition up to 100 wt % being made up of the aliphatic polyester polymer composition together with any other blend components or additives present in the composition (such as a separately-added plasticizer).

In another embodiment, the aliphatic polyester polymer composition can be present in the compositions hereof in an amount of not more than about 10 wt %, or not more than about 20 wt %, or not more than about 30 wt %, or not more than about 40 wt %, or not more than about 50 wt %, or not more than about 55 wt %, or not more than about 65 wt %, or not more than about 85 wt %, or not more than about 88 wt %, or not more than about 90 wt %, with the balance of the composition up to 100 wt % being made up of a polyvinyl alcohol polymer composition together with any other blend components or additives present in the composition (such as a separately-added plasticizer).

In another embodiment, a further composition hereof found to be particularly suitable is a composition wherein the polyvinyl alcohol is selected from the group consisting of: (a) a hydrolyzed polyvinyl alcohol having (i) a degree of polymerization of from about 300 to about 3000, and (ii) a degree of hydrolysis of from about 70% to 100%; (b) a copolymer of vinyl acetate and ethylene as comonomers, having (i) an ethylene content of from about 0.1 mol % to about 15.0 mol % based on the total moles of comonomers; (ii) a degree of polymerization of from about 300 to about 3000; and (iii) a degree of hydrolysis of from about 85% to 100%; and (c) a hydrolyzed copolymer of vinyl acetate and one or more unsaturated acids as comonomers, wherein (i) the copolymer has (A) an unsaturated acid content of from about 0.1 mol % to about 15.0 mol % based on the total moles of comonomers, (B) a degree of polymerization of from about 300 to about 3000, and (C) a degree of hydrolysis of from about 70% to 100%; and (ii) the unsaturated acid is selected from the group consisting of (A) a monocarboxylic unsaturated acid, (B) a dicarboxylic unsaturated acid, (C) an alkyl ester of (A), (D) an alkyl ester of (B), (E) an alkali metal salt of (A), (F) an alkali metal salt of (B), (G) an alkaline earth metal salt of (A), (H) an alkaline earth metal salt of (B), (J) an anhydride of (A), and (K) an anhydride of (B).

In view of the superior solubility performance of the compositions hereof, it is not surprising to find that, when the components of a composition of this invention are mixed together to form the composition, a cross-linked structure does not occur. A cross-linked structure is typically characterized by the presence of a three-dimensional network containing covalent bonds between polymer chains. The existence of a polymeric composition in the form, for example, of an elastic gel, a rigid gel, an elastic solid; a rigid solid; a brittle solid or a foamed material is consistent with the morphology considered to be characteristic of a cross-linked polymer system, and, as expected, such physical forms are not observed in the composition hereof. By contrast, when the blends of this composition are prepared, one of the components is typically discontinuously dispersed in the form of fine domains or phases in a continuous matrix of the other component, similar to an islands-in-the sea arrangement. Usually, but not always, the component that is present in the greater amount forms the continuous matrix. In various preferred embodiments, for example, an aliphatic polyester component can be present in the composition in the form of fine domains dispersed discontinuously in a matrix of the PVOH wherein the average largest cross-sectional dimension of those dispersed aliphatic polyester domains, as determined by scanning electron microscopy (as described in the Examples), can be from about 1 to about 10 microns, or to about 8 microns, or to about 6 microns, or to about 4 microns.

As discussed above, the presence of a polyvinyl alcohol in admixture with an aliphatic polyester produces a composition characterized by solubility under a variety of conditions that are easily provided, even in a downhole environment. This can be illustrated, for example, by noting that a composition hereof containing about 15 wt % or more, or about 35 wt % or more, or about 50 wt % or more, or about 60 wt % or more, or about 70 wt % or more, or about 80 wt % or more, or about 90 wt % or more of a polyvinyl alcohol polymer composition is soluble to the extent of at least about 25, or at least about 40, or at least about 60, or at least about 80, or at least about 95, or at least about 98 percent of its weight after being held in water in a glass vessel at 195° F. for 6 hours. The water used is either deionized (DI) water or brine, where a suitable brine can be prepared by adding 5.84 grams of sodium chloride to 994.16 grams of DI water. Percent of solubility is determined by weighing the vessel together with the liquid and solids before the start of the 6-hour period, decanting the liquid after the 6-hour period without disturbing remaining solids, weighing the vessel with the remaining solids, and comparing the before and after weights to determine was amount of the solid composition was contained in the decanted liquid.

Uses of the Particulate Compositions

The particulate compositions of the present invention can be used as plugging agents in fluid injection operations for subsurface wells by processes as generally known to those of ordinary skill in the art, and as exemplified in many of the previously incorporated references.

The particulate plugging agents of the present invention can be used to temporarily plug cracks and decrease (or prevent) fluid and loss into such cracks.

Specific uses include as diverting agents and as loss control materials, as described above.

The plugging agent is designed to be temporary and can be removed by dissolving it using the fluids after completion of the treatment The plugging agents can be used in the servicing of vertical wells, but they are equally applicable to wells of any orientation. In addition, although the description herein may be presented in terms of servicing hydrocarbon-production wells, it is to be understood that the disclosed methods can be used for wells for the production of other fluids, such as water or carbon dioxide, or, for example, for injection or storage wells.

The particulate compositions of this invention have suitable stability for sufficient time periods to be useful in subterranean formations wherein downhole temperatures typically can range from about 100° F. up to about 250° F., although, in most cases, these compositions are used at temperatures in the range of from about 190° F. to about 210° F. When a composition hereof is being used for a downhole treatment, the particle size distribution thereof sought to be obtained from the processes and methods of this invention can vary widely depending on the permeability of the substrate, the nature of the carrier fluid, the subsurface temperature profile, and the particular polyvinyl alcohol composition being used, and can be adjusted as described above.

This invention therefore further provides a method of reducing the loss of one or more desired fluids from a subsurface formation, or from the confines of a wellbore installed within such formation, by introducing a particulate composition according to this invention into an opening in a wall of the formation. Performing such a method typically involves introducing the composition into an opening in a wall of the formation to temporarily or permanently seal the opening therein, which step of introducing can be or include a step of pumping, injecting, releasing, spotting, circulating, or otherwise emplacing a composition hereof into an opening in a wall of a formation. Access to the opening in the wall is obtained from the wellbore, or from a device that has been inserted in the wellbore and is used for that purpose.

Any one or more of the particulate compositions of this invention, whether described above in terms of size classification, or described elsewhere herein in other terms, can be used in the step of introducing such composition into an opening in the wall of a subsurface formation.

A plugging agent can be pumped down the wellbore at high pressure and into the leaking zone(s) to be plugged, and the plugging agent will enter the weakest portions of the zone first followed then by other portions including those where fluids crossflow through the wellbore or blow out into the wellbore. The plugging agent stops the loss of service fluids and allows high drilling fluid densities to be utilized when needed while drilling ahead. Once the plugging agent has been placed, it increases the fracture gradient to a higher value that can eliminate the need for intermediate casing, drilling liners and the like. Because the plugging agent readily diverts drilling fluids to other weak zones in the well bore, the integrity of the entire well bore is improved by the plugging agent.

In one embodiment, a plugging agent can be placed into a wellbore in the form of a "single pill" fluid; that is, all components of the plugging agent are mixed and introduced into the wellbore as a single composition and as a single stream. In such case, the plugging agent is typically activated by downhole conditions to form a seal in one or more leaking zones, and for such purpose the plugging agent may be placed downhole through multiple ports in the drill bit.

In an alternative embodiment, the plugging agent can be formed downhole by the mixing of a first stream containing one or more components and a second stream containing additional components. In such an embodiment, the compositional components can be selected such that the first and second streams react with each other, or one group of components can be encapsulated an introduced in that form instead of as a stream. When differing groups of components are introduced as independent fluid streams, one of them may be introduced through the tubular string of drill pipe, and the other may be introduced in the anulus between the drill string and the wall of the borehole.

Methods for introducing plugging agents into a wellbore to bridge, seal or plug leaks in leaking subterranean zones are further described, for example, in U.S. Pat. Nos. 5,913,364, 6,167,967 and 6,258,757.

EXAMPLES

The following examples will facilitate a more complete understanding of this invention, but it is understood that the invention is not limited to the specific embodiments presented below.

Compositions representative of the inventions hereof are prepared for testing using materials that include the following:

"PVOH #1" was a polyvinyl alcohol-based composition (containing greater than 96 wt % polyvinyl alcohol polymer) available from Kuraray Co., Ltd. (Tokyo, JP) under the trade designation MOWIFLEX™ C17 resin, and which has the following specifications: (i) a bulk density of from about 0.6 to about 0.9 g/cm$^3$; (ii) a melt flow index ("MFI") of from about 14 to about 20 g/10 min. (wherein MFI is determined at 190° C. under a load of 21.6 kg in accordance with ASTM D1238-13); and (iii) a glass transition temperature (Tg) of from about 50° C. to about 60° C., and a melting point (Tm) of from about 165° C. to about 175° C., wherein Tg and Tm are the second measured values when a 10 □/minute temperature increase is done twice as measured by differential scanning calorimetry.

"PVOH #2" was a polyvinyl alcohol-based composition (containing greater than 96 wt % polyvinyl alcohol polymer) available from Kuraray Co., Ltd. (Tokyo, JP) under the trade designation MOWIFLEX™ C30 resin, and which has the following specifications: (i) a bulk density of from about 0.6 to about 0.9 g/cm³; (ii) a melt flow index ("MFI") of from about 20 to about 40 g/10 min. (wherein MFI is determined at 190° C. under a load of 21.6 kg in accordance with either the ASTM D1238-13); and (iii) a glass transition temperature (Tg) of about 25° C., and a melting point (Tm) of about 170° C., wherein Tg and Tm are the second measured values when a 10 □/minute temperature increase is done twice as measured by differential scanning calorimetry.

"PVOH #3" used in the examples below was produced by bypassing the neutralization unit in the production process for ELVANOL™ 80-18 resin, and as a result the excess alkali catalyst was not neutralized and remained in slurry, as described in previously incorporated US2019/0055326A1. The PVOH particles are a free-flowing powder that has a 99.5 mol % hydrolysis, and a viscosity (at 4% and 20° C.) of 20 mPa·s.

"PVOH #4" was a hydrophobically modified ethylene/vinyl alcohol copolymer available from Kuraray Co., Ltd. (Tokyo, JP) under the trade designation EXCEVAL™ AQ 4104, which has a hydrolysis of from about 98 to about 99 mol %, and a viscosity (at 4% and 20° C.) of from about 3.5 to about 4.5 mPa·s.

"Aliphatic Polyester #1" was a high molecular weight polylactic acid (PLA) based thermoplastic resin available under the trade designation Ingeo™ 2003 D Biopolymer from NatureWorks LLC (Minnetonka Minn. USA), and has the following specifications: (i) a melt flow rate of 6 g/10 min (measured according to ASTM D1238 (2.16 Kg at 210° C.)); (ii) a Tg of from about 55° C. to about 60° C. (ASTM D1238); (iii) a tensile strength at break of 53 MPa (ASTM D882); and (iv) a specific gravity of 1.24 g/cc (ASTM D792).

"Aliphatic Polyester #2" was a high molecular weight polylactic acid (PLA) based thermoplastic resin available under the trade designation Ingeo™ 3 D850 Biopolymer from NatureWorks LLC (Minnetonka Minn. USA), and has the following specifications: (i) a melt flow rate of 6 g/10 min (measured according to ASTM D1238 (2.16 Kg at 210° C.)); (ii) a glass transition temperature of from about 55° C. to about 60° C. (ASTM D1238); (iii) a melting point about 165° C. to about 180° C. (ASTM D3418); (iv) a tensile strength at break of 53 MPa (ASTM D882); and (V) a specific gravity of 1.24 g/cc (ASTM D792).

"Plasticizer" is a polyethylene glycol plasticizer having an $M_n$ of about 600, available under the trade designation CARBOWAX™ 600 polyethylene glycol from The Dow Chemical Company (Freeport, Tex. USA).

Examples 1-7 and Control A. The compositions of Examples 1-7 were prepared by blending a polyvinyl alcohol polymer and an aliphatic polyester polymer. In Examples 4, 5 and 6, 10 wt % of Plasticizer (based on total weight) was added to the composition prior to blending. The components were mixed together in a DSM vertical mini-extruder, which was preheated to 190° C. The blend was mixed for 10 minutes at a screw speed of 100 RPM to produce strands from the melt. The strands were cooled by air and pelletized. The target pellet size was 3 to 4 mesh.

In Control A, the composition was formed from Aliphatic Polyester #2 alone, and was also pelletized as described above.

The solubility of the samples of Control A and of the compositions of Examples 1-7 was determined by placing 30 grams of the pelletized sample in 470 grams of deionized water in a vessel equipped with an agitator. The agitator speed inside the dissolution vessel was set at 20 RPM. The timer was started as soon as the temperature inside of the dissolution vessel reached the desired temperature (149° F., 158° F. or 176° F.). 10 mL of sample in the dissolution vessel was then collected in a centrifuge tube at time (t): 15, 30, 60, 120, 180, 240, 300, 360 and 420 minutes. The 10 mL sample was placed in centrifuge for 10 minutes at 1,500 RPM. The supernatant liquid collected after centrifugation was filtered through a 200 mesh sieve screen and placed into a pre-weighed aluminum pan. The sample together with the aluminum pan was then placed in an oven set to 105° C. and left overnight (approximately 10 to 14 hours) to dry. The pan and contents were weighed and the percent solubles were then calculated using the following equation:

Water Solubles (%)=(Weight of Residue plus pan– Weight of pan)*100/Weight of sample.

The solubility of the samples of Examples 1-7 was compared to that of Control A, which was pure aliphatic polyester, and is shown in Table 1. Table 1 shows that after six hours at the specified temperature, the solubility of Control A was less than 5% while that of Examples 3-7 was over 50%.

TABLE 1

| | Blend Composition Content (wt %) | Temp. (° F.) | % PVOH Solubles | % PLA Solubles |
|---|---|---|---|---|
| Control A | Aliphatic Polyester #2 (100 wt %) | 158 | — | 2.0 |
| Example 1 | Aliphatic Polyester #2 (70 wt %) PVOH #2 (30 wt %) | 158 | 5.2 | — |
| Example 2 | Aliphatic Polyester #2 (60 wt %) PVOH #2 (40 wt %) | 149 | 8.2 | — |
| Example 3 | Aliphatic Polyester #2 (50 wt %) PVOH #2 (50 wt %) | 149 | 77.8 | — |
| Example 4 | Aliphatic Polyester #2 (45 wt %) PVOH #2 (45 wt %) Plasticizer (10 wt %) | 158 | 85.6 | — |
| Example 5 | Aliphatic Polyester #1 (25 wt %) PVOH #2 (65 wt %) Plasticizer (10 wt %) | 158 | 95.6 | — |
| Example 6 | Aliphatic Polyester #2 (45 wt %) PVOH #2 (45 wt %) Plasticizer (10 wt %) | 176 | 96.2 | — |
| Example 7 | Aliphatic Polyester #1 (50 wt %) PVOH #1 (50 wt %) | 176 | 78.2 | — |

Example 8 and Control B. The composition of Example 8 was prepared by compacting a uniform blend of 50 wt % Aliphatic Polyester #1 with 50 wt % of plasticized PVOH #3. The plasticized PVOH #3 component was first prepared by spraying 1.5 parts by weight of Plasticizer (based on 100 parts by weight of PVOH #3) onto PVOH #3. The plasticized PVOH #3 was then uniformly blended with the Aliphatic Polyester #1. The resulting uniform blend was then compacted by placing it between two counter-rotating rolls of a double roll compactor. The rolls applied 20 T of pressure to press the mixture into a sheet-like form. This sheet of material was then fed through a granulator, where it was broken up into granules that were random in shape but reasonably uniform in size. A screener having mesh openings selected for a target size-range was used to sort the agglomerated particles according to size. Particles that fell outside the targeted size-range were recycled from the screener back to the compactor followed, subsequently, by being again fed to the granulator. The targeted particles size was 3 to 4 mesh.

Granules of the composition of Example 8, in addition to granules of plasticized PVOH #3 alone (Control B), were obtained by the above described use of a roll-mill/granulator device. The granules of Example 8 and Control B were then subjected to the same type of solubility test as described above for Examples 1-7 and Control A but, for Example, 8 and Control B, the temperature inside the dissolution vessel was 158° F., and the sample for weighing was extracted after 6 hours. Table 2 shows that, after six hours at 158° F., the solubility of Example 8 was over 50% and very similar to PVOH #3 alone.

TABLE 2

| | Blend Composition (wt %) | Temperature (° F.) | % PVOH solubles |
|---|---|---|---|
| Control B | Plasticized PVOH #3 (100 wt %) | 158 | 98.6 |
| Example 8 | Plasticized PVOH #3 (50 wt %) Aliphatic Polyester #1 (50 wt %) | 158 | 97.2* |

*Average of three determinations.

Figure 1B:
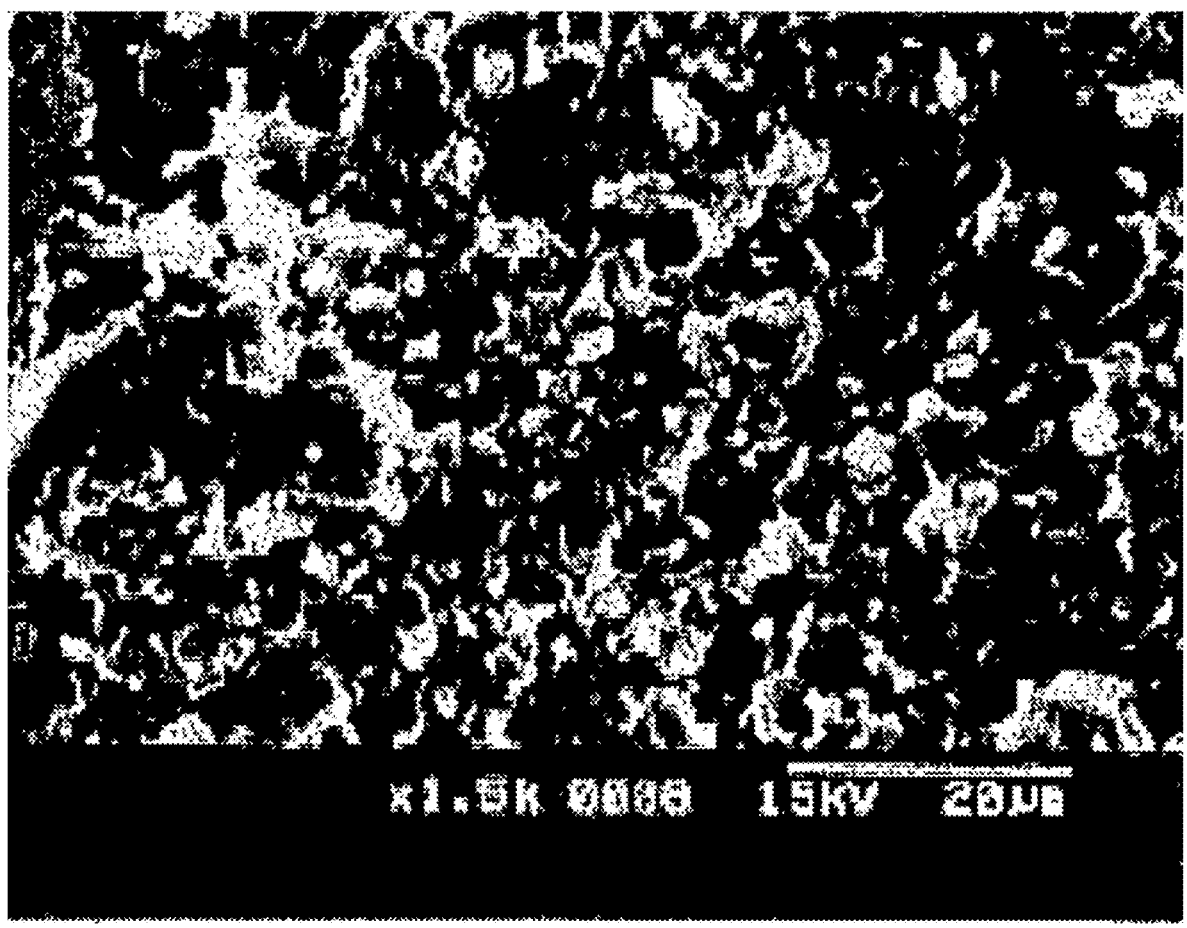
Figure 1C:
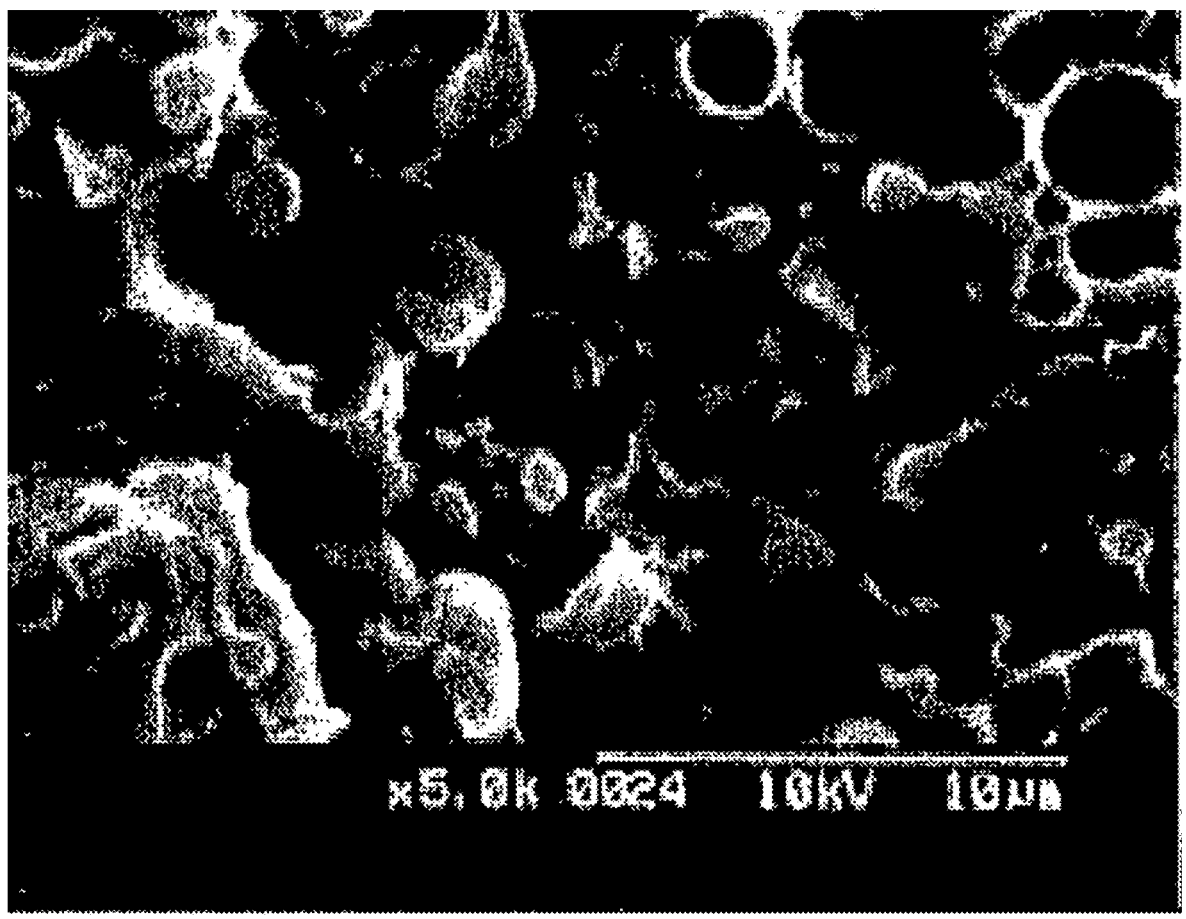
Figure 2A:
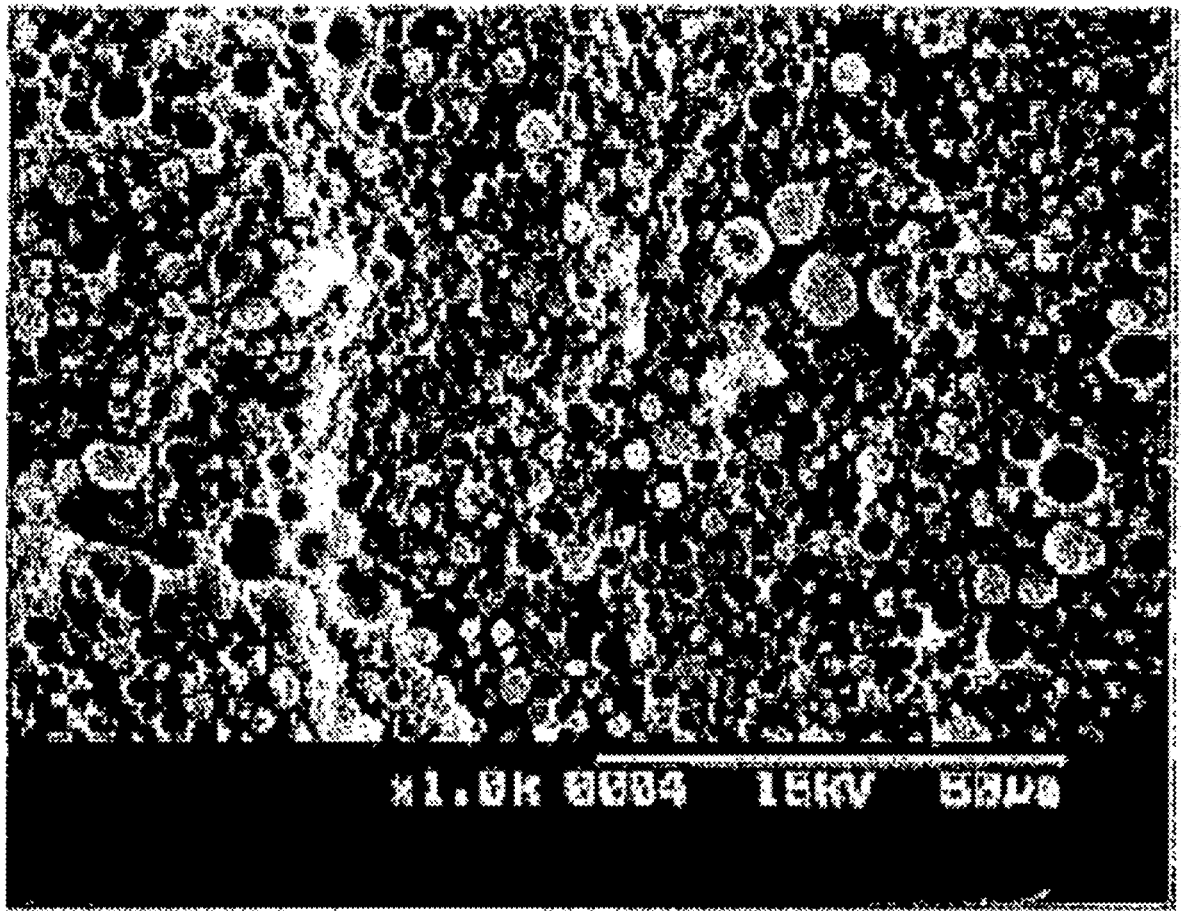
FIGS. 2(A), 2(B) and 2(C) are a set of three SEM photomicrographs, at different magnifications, of a pellet of a melt blend from Example 10.
Figure 2B:
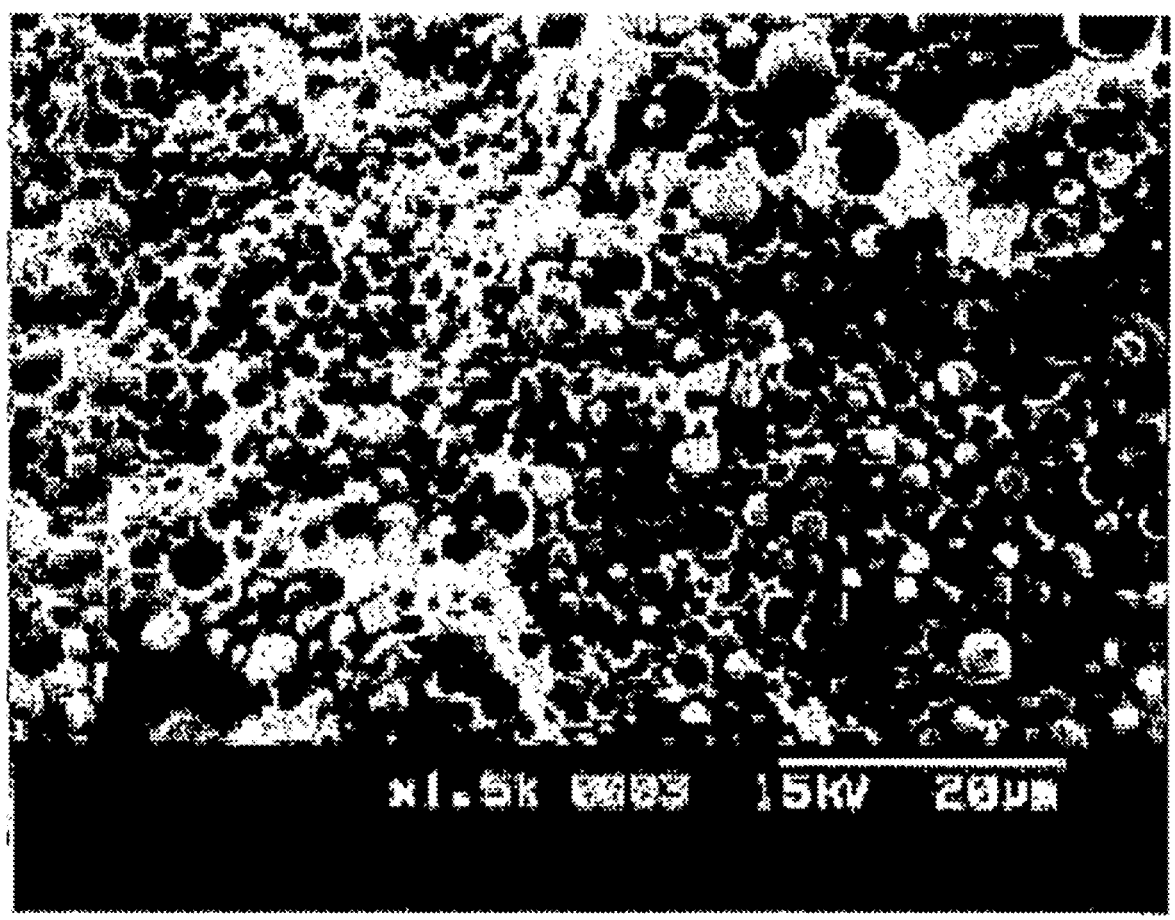
Figure 2C:
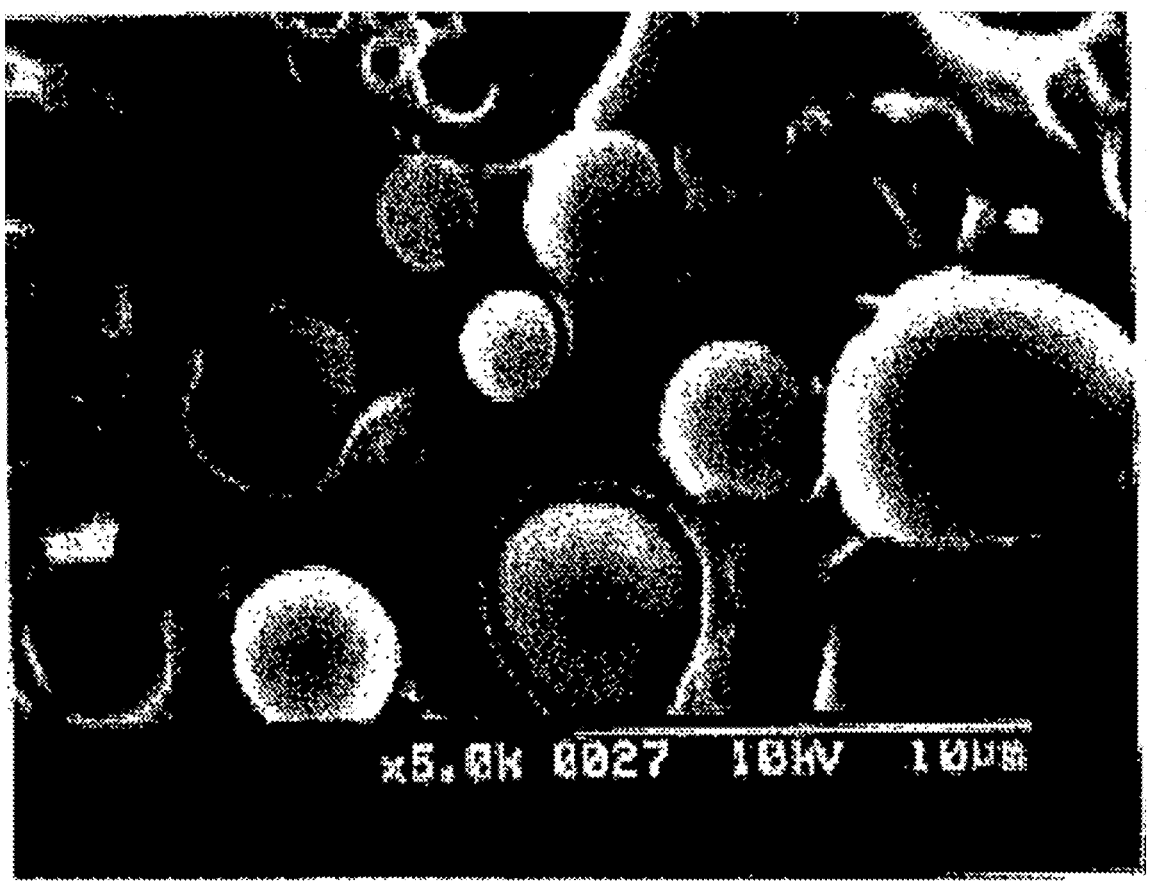
Figure 3:
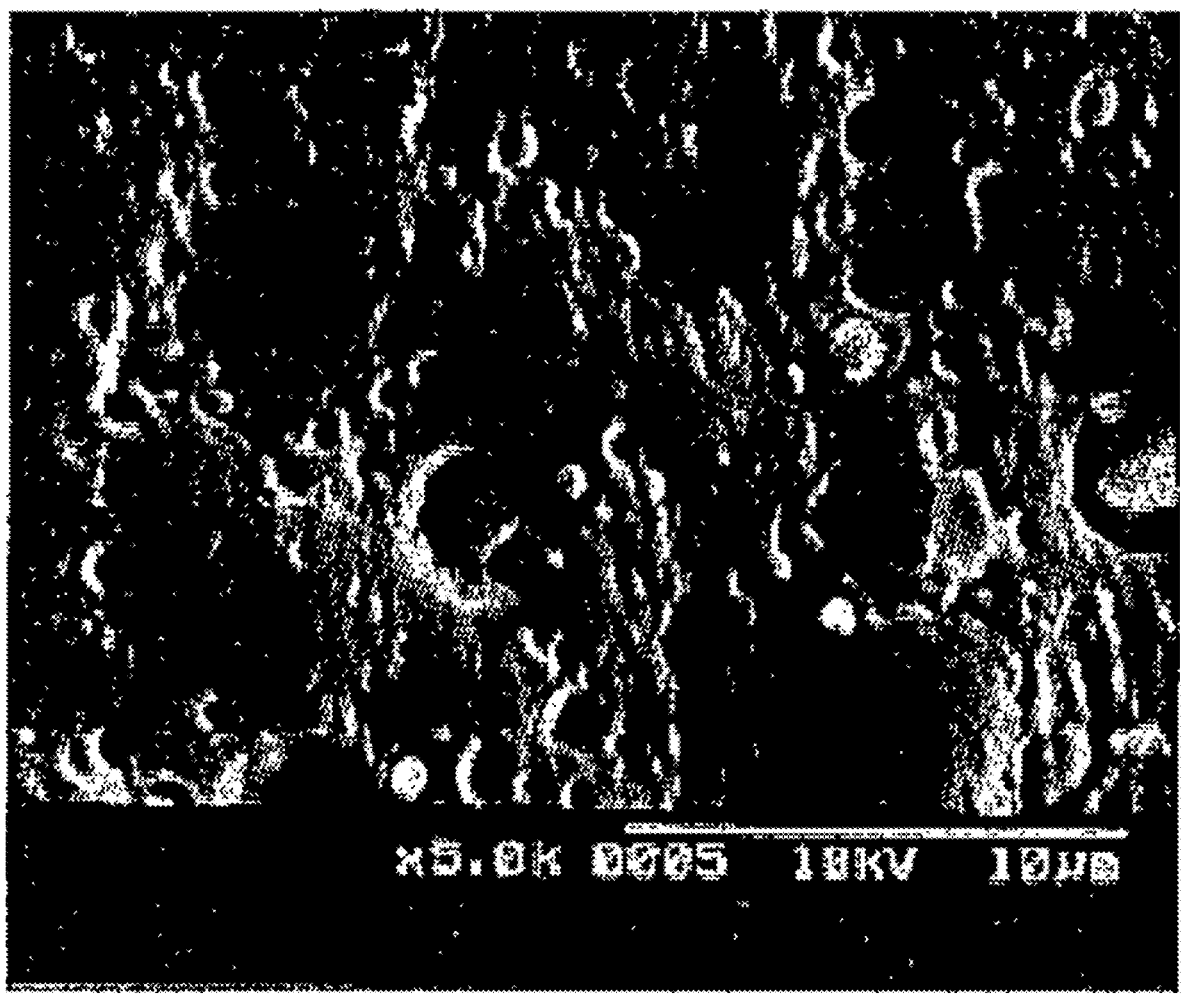
FIG. 3 is an SEM photomicrograph of a pellet of a melt blend from Example 11.

Examples 9-12. The compositions of Examples 9-12 were prepared by a pelletization process, as described above for Examples 1-7 and Control A, in which blend components are mixed and then pelletized in an extruder. The components of the blended compositions were as follows:

Example 9: 70 wt % PVOH #4, 30 wt % Aliphatic Polyester #2, FIGS. 1(A), 1(B) and 1(C);

Example 10: 30 wt % PVOH #4, 70 wt % Aliphatic Polyester #2, FIGS. 2(A), 2(B) and 2(C);

Example 11: 90 wt % PVOH #4, 10 wt % Aliphatic Polyester #2, FIG. 3

Figure 4:
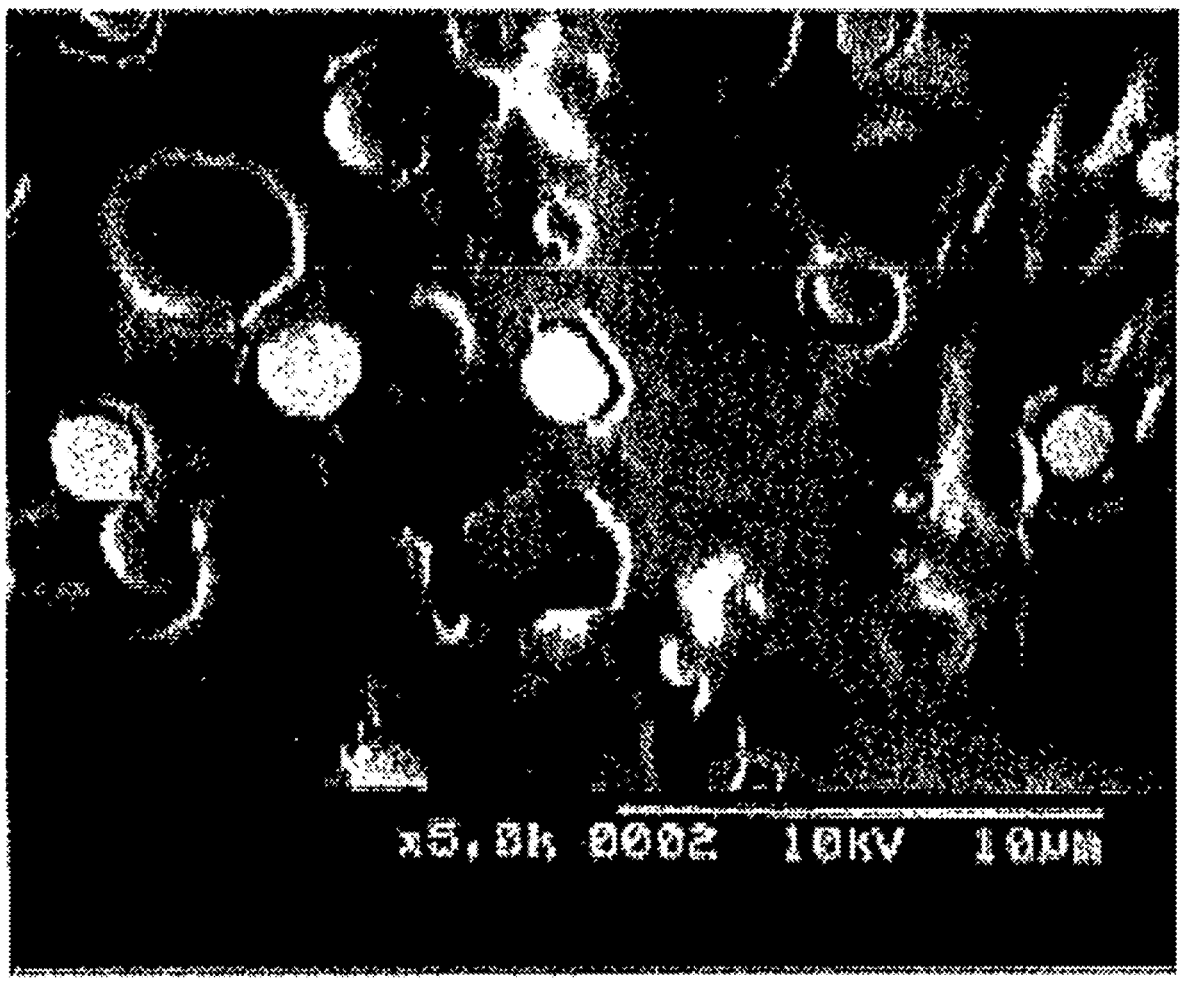
FIG. 4 is an SEM photomicrograph of a pellet of a melt blend from Example 12.

Example 12: 10 wt % PVOH #4, 90 wt % Aliphatic Polyester #2, FIG. 4.

A sample of a pellet made from each example was examined under a scanning electron microscopy (SEM) to determine the average largest dimension of the cross-sectional area of the particles of the various components of the composition shown in the image. SEM images of a pellet of each of Examples 9-12, showing the cross-sectional area of the various particles from which the pellet was composed, are shown, respectively, in FIGS. 1, 2, 3 and 4.

In general, the compositions of Examples 9-12 were found to be characterized by a morphology of fine particles of one component dispersed in a continuous phase of the other component, similar to an islands-in-the-sea arrangement. The SEM (scanning electron microscope) images were analyzed to determine average largest cross-section diameter of the dispersed phase. SEM used in this experiments was an ultra-high resolution morphological imaging model SU-70 from Hitachi. The specimen was cut using a sharp razorblade to obtain a representative cross section of the sample and to prepare an appropriate size for the SEM sample holder. The specimen was embedded in a thermosetting resin to fix it for easy cut-out. The specimen was brought to the sputtering system and was surface coated with platinum metal for the charge compensation. After coating process was completed, the sample was carried to the SEM and was set on the sample holder and the vacuum system was resumed. The sample was set to the SEM sample holder by using carbon tape. The specimen was observed with the required magnification. An acceleration voltage of 15 KeV was used.

In the composition of Example 9, the aliphatic polyester particles dispersed in the continuous phase of the polyvinyl alcohol have an average largest cross-sectional dimension of from about 2 to about 4 microns.

In the composition of Example 10, the PVOH particles dispersed in the continuous phase of the aliphatic polyester have an average largest cross-sectional dimension of from about 1 to about 7 microns.

In Example 11, the aliphatic polyester particles dispersed in the continuous phase of the polyvinyl alcohol have an average largest cross-sectional dimension of from about 1 to about 4 microns.

In the composition of Example 12, the PVOH particles dispersed in the continuous phase of the aliphatic polyester have an average largest cross-sectional dimension of from about 2 to about 5 microns.

The solubility of a sample of the pellets of the blended composition of Example 9, and of Example 11, each having a continuous phase of polyvinyl alcohol and a dispersed phase of aliphatic polyester, is evaluated using a protocol based on that described above for Examples 1-8. A sample of pellets was, separately for each example, placed in DI water in a dissolution vessel having an agitator with a speed of 20 RPM, and the mixture of pellets and water was held at 70° C. After approximately 6 hours, a 10 mL sample of the contents of the dissolution vessel was collected in a centrifuge tube, and the tube containing the 10 mL sample was placed in centrifuge for 10 minutes at 1,500 RPM. The supernatant liquid collected after centrifugation was filtered through a 200 mesh sieve screen, and it was found that no residue is collected on the screen, indicating that the sample of the particular example (10 or 12) was dissolved.

These examples illustrate that increasing the relative amount of polyvinyl alcohol over the amount of other blend components such as an aliphatic polyester) increases the degree of solubility of the compositions prepared in such fashion, and allows for the customization of dissolution rates as required for the particular end use.

What is claimed is:

1. A particulate composition comprising particles including a blend comprising:
   (a) one or more polyvinyl alcohol polymers;
   (b) one or more aliphatic polyester polymers, wherein the one or more aliphatic polyester polymers comprise an aliphatic polyester polymer grafted with a hydrophilic monomer selected from the group consisting of methacrylates, ethylene glycols, allylic alcohols, acrylates, methacrylamides, pyrrolidones, vinyl alcohol, methacrylic acid, and acrylic acid, and
   (c) optionally one or more additives, wherein the blend comprises:
      (i) from about 5 wt % to about 95 wt % of the one or more polyvinyl alcohol polymers, and
      (ii) from about 5 wt % to about 95 wt % of the one or more aliphatic polyester polymers, based on the combined weight of the one or more polyvinyl alcohol polymers and the one or more aliphatic polyester polymers.

2. The particulate composition of claim 1, wherein the blend comprises from greater than 45 wt % to about 95 wt % of the one or more polyvinyl alcohol polymers, and from about 5 wt % up to about 55 wt % of the one or more aliphatic polyester polymers, based on the combined weight of the polyvinyl alcohol polymers and the aliphatic polyester polymers.

3. The particulate composition of claim 2, wherein the blend comprises from about 50 wt % to about 95 wt % of the one or more polyvinyl alcohol polymers, and from about 5 wt % to about 50 wt % of the one or more aliphatic polyester polymers, based on the combined weight of the polyvinyl alcohol polymers and the aliphatic polyester polymers.

4. The particulate composition of claim 3, wherein the blend comprises from about 66 wt % to about 95 wt % of the one or more polyvinyl alcohol polymers, and from about 5 wt % to about 34 wt % of the one or more aliphatic polyester polymers, based on the combined weight of the polyvinyl alcohol polymers and the aliphatic polyester polymers.

5. The particulate composition of claim 4, wherein the blend comprises from about 66 wt % to about 80 wt % of the one or more polyvinyl alcohol polymers, and from about 20 wt % to about 34 wt % of the one or more aliphatic polyester polymers, based on the combined weight of the polyvinyl alcohol polymers and the aliphatic polyester polymers.

6. The particulate composition of claim 1, wherein the one or more aliphatic polyester polymers comprise a polylactic acid, a polyglycolic acid and/or a copolymer prepared from lactic acid and glycolic acid.

7. The particulate composition of claim 1, wherein the polyvinyl alcohol is selected from the group consisting of:
(a) a hydrolyzed polyvinyl alcohol homopolymer having (i) a degree of polymerization of from about 300 to about 3000, and (ii) a degree of hydrolysis of from about 70% to 100%;
(b) a hydrolyzed copolymer of vinyl acetate and ethylene as comonomers, having (i) an ethylene content of from about 0.1 mol % to about 15.0 mol % based on the total moles of comonomers; (ii) a degree of polymerization of from about 300 to about 3000; and (iii) a degree of hydrolysis of from about 85% to 100%; and
(c) a hydrolyzed copolymer of vinyl acetate and one or more unsaturated acids as comonomers, wherein
(i) the copolymer has (A) an unsaturated acid content of from about 0.1 mol % to about 15.0 mol % based on the total moles of comonomers, (B) a degree of polymerization of from about 300 to about 3000, and (C) a degree of hydrolysis of from about 70% to 100%; and
(ii) the unsaturated acid is selected from the group consisting of (A) a monocarboxylic unsaturated acid, (B) a dicarboxylic unsaturated acid, (C) an alkyl ester of (A), (D) an alkyl ester of (B), (E) an alkali metal salt of (A), (F) an alkali metal salt of (B), (G) an alkaline earth metal salt of (A), (H) an alkaline earth metal salt of (B), (J) an anhydride of (A), and (K) an anhydride of (B).

8. The particulate composition of claim 7, wherein the polyvinyl alcohol polymer composition comprises a hydrolyzed copolymer of vinyl acetate and one or more lower alkyl acrylate ester monomers.

9. The particulate composition of claim 7, wherein the polyvinyl alcohol polymer composition comprises (c) a hydrolyzed copolymer of vinyl acetate and one or more unsaturated acids as comonomers, wherein the hydrolyzed copolymer is a non-neutralized acid-functional polyvinyl alcohol copolymer.

10. The particulate composition of claim 1, wherein the polyvinyl alcohol polymer composition is a thermoplastic polyvinyl alcohol composition comprising one or more polyvinyl alcohol polymers and a plasticizer.

11. The particulate composition of claim 1, wherein the blend comprises an aliphatic polyester polymer that is a discontinuously dispersed phase in a matrix of a polyvinyl alcohol polymer, wherein the dispersed aliphatic polyester phase has an average largest cross-sectional dimension in the range of from about 1 to about 10 microns.

12. The particulate composition of claim 1, wherein the composition has a particle size distribution wherein:
(i) the portion of 10 mesh on (U.S. Sieve Series) is from about 10 wt % to about 60 wt %; and
(ii) the portion of 10 mesh pass and 16 mesh on is from about 40 wt % to about 90 wt %.

13. The particulate composition of claim 1, with a particle size ranging from 3 mesh to 200 mesh (U.S. Sieve Series).

14. The particulate composition of claim 1, wherein the composition has a particle size of from 3 mesh to 18 mesh (U.S. Sieve Series).

15. The particulate composition of claim 1, wherein the particles have an average density of about 0.9 g/mL or greater.

16. The particulate composition of claim 1, wherein the particulate composition has a bulk density of from about 0.5 g/ml to about 0.8 g/ml.

17. A method of treating a subsurface formation to divert flow of a fluid from one zone of the subsurface formation to another, by pumping into the subsurface formation an aqueous carrier liquid having dispersed therein a particulate plugging agent, wherein the particulate plugging agent is the particulate composition according to claim 1.

18. The method of claim 17, where the plugging agent is temporary and subsequently removed by dissolution.

19. The method of claim 17, wherein the blend comprises an aliphatic polyester polymer that is a discontinuously dispersed phase in a matrix of a polyvinyl alcohol polymer, wherein the dispersed aliphatic polyester phase has an average largest cross-sectional dimension in the range of from about 1 to about 10 microns, as determined by scanning electron microscopy.

20. A particulate composition comprising particles including:
a uniform blend comprising:
(a) one or more polyvinyl alcohol polymers;
(b) one or more aliphatic polyester polymers; and
(c) optionally one or more additives;
wherein the uniform blend comprises:
(i) from about 5 wt % to about 95 wt % of the one or more polyvinyl alcohol polymers, and
(ii) from about 5 wt % to about 95 wt % of the one or more aliphatic polyester polymers,
based on the combined weight of the one or more polyvinyl alcohol polymers and the one or more aliphatic polyester polymers, and
wherein the one or more polyvinyl alcohol polymers comprise a hydrolyzed copolymer of vinyl acetate and ethylene as comonomers, having an ethylene content of from about 0.1 mol % to about 15.0 mol % based on the total moles of comonomers.

21. The particulate composition of claim 20, wherein the uniform blend comprises from about 51 wt % to about 95 wt % of the one or more aliphatic polyester polymers.

* * * * *